(12) United States Patent
Hasegawa

(10) Patent No.: US 8,264,380 B2
(45) Date of Patent: Sep. 11, 2012

(54) CODE WHEEL MANUFACTURING METHOD, CODE WHEEL, ROTARY ENCODER, ROTATION CONTROL UNIT, BELT CARRIER UNIT, AND IMAGE FORMING APPARATUS

(75) Inventor: Koichi Hasegawa, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 626 days.

(21) Appl. No.: 12/385,283

(22) Filed: Apr. 3, 2009

(65) Prior Publication Data

US 2009/0256309 A1 Oct. 15, 2009

(30) Foreign Application Priority Data

Apr. 10, 2008 (JP) ................................ 2008-102326

(51) Int. Cl.
*H03M 1/22* (2006.01)
(52) U.S. Cl. .................. 341/15; 341/13; 250/231.13
(58) Field of Classification Search .............. 341/13, 341/15; 250/231.13, 231.16
See application file for complete search history.

(56) References Cited

U.S. PATENT DOCUMENTS

| | | | | |
|---|---|---|---|---|
| 5,949,067 A | * | 9/1999 | Sano ................... | 250/231.13 |
| 2004/0206894 A1 | * | 10/2004 | Oka et al. ............. | 250/231.13 |
| 2009/0002681 A1 | | 1/2009 | Hasegawa | |

FOREIGN PATENT DOCUMENTS

| | | |
|---|---|---|
| JP | 64-027827 | 1/1989 |
| JP | 6-194185 | 7/1994 |
| JP | 09-079867 | 3/1997 |
| JP | 2005-134763 | 5/2005 |
| JP | 2006-292724 | 10/2006 |
| JP | 2006-300871 | 11/2006 |
| JP | 2006-300873 | 11/2006 |

OTHER PUBLICATIONS

Office Action dated Jun. 5, 2012 for corresponding Japanese Patent Application No. 2008-102326.

* cited by examiner

*Primary Examiner* — Jean B Jeanglaude
(74) *Attorney, Agent, or Firm* — Harness, Dickey & Pierce, P.L.C.

(57) ABSTRACT

A manufacturing method for a code wheel for a rotary encoder is provided. The code wheel includes, in a central portion, a hole into which a rotary shaft of a rotary member is fitted and a code portion including a radial code pattern in a circumferential edge portion. The manufacturing method is configured to include the steps of forming the code portion and a reference circle in a plate so that the reference circle has a radius larger than a radius of the hole by a tolerance of deviation between a center position of the code portion and a center position of the hole and has a same center as that of the code portion; and forming the hole in the plate in which the code portion and the reference circle are formed, so as to be contained in the reference circle.

20 Claims, 30 Drawing Sheets

ENCODER OUTPUT SIGNAL

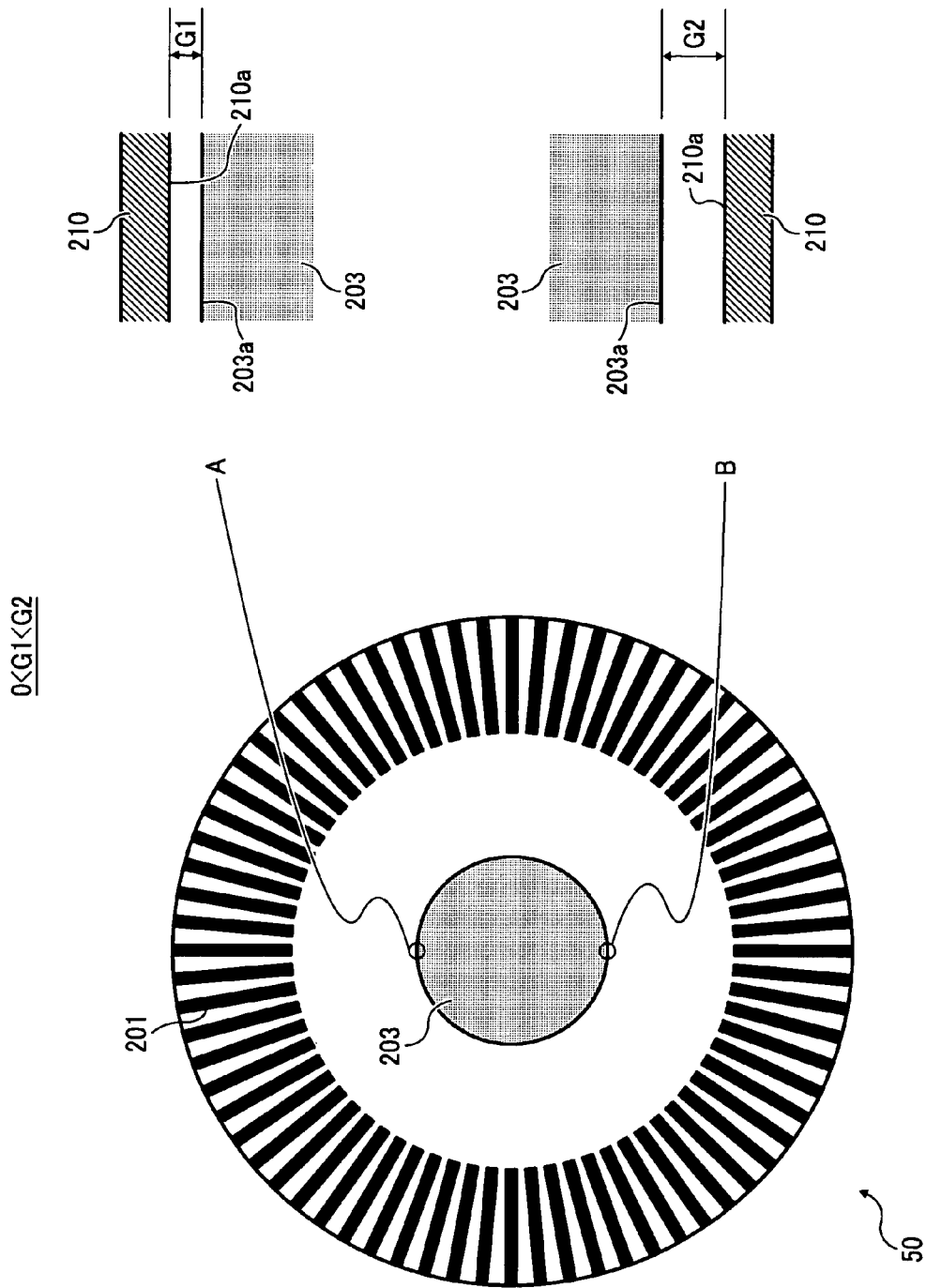

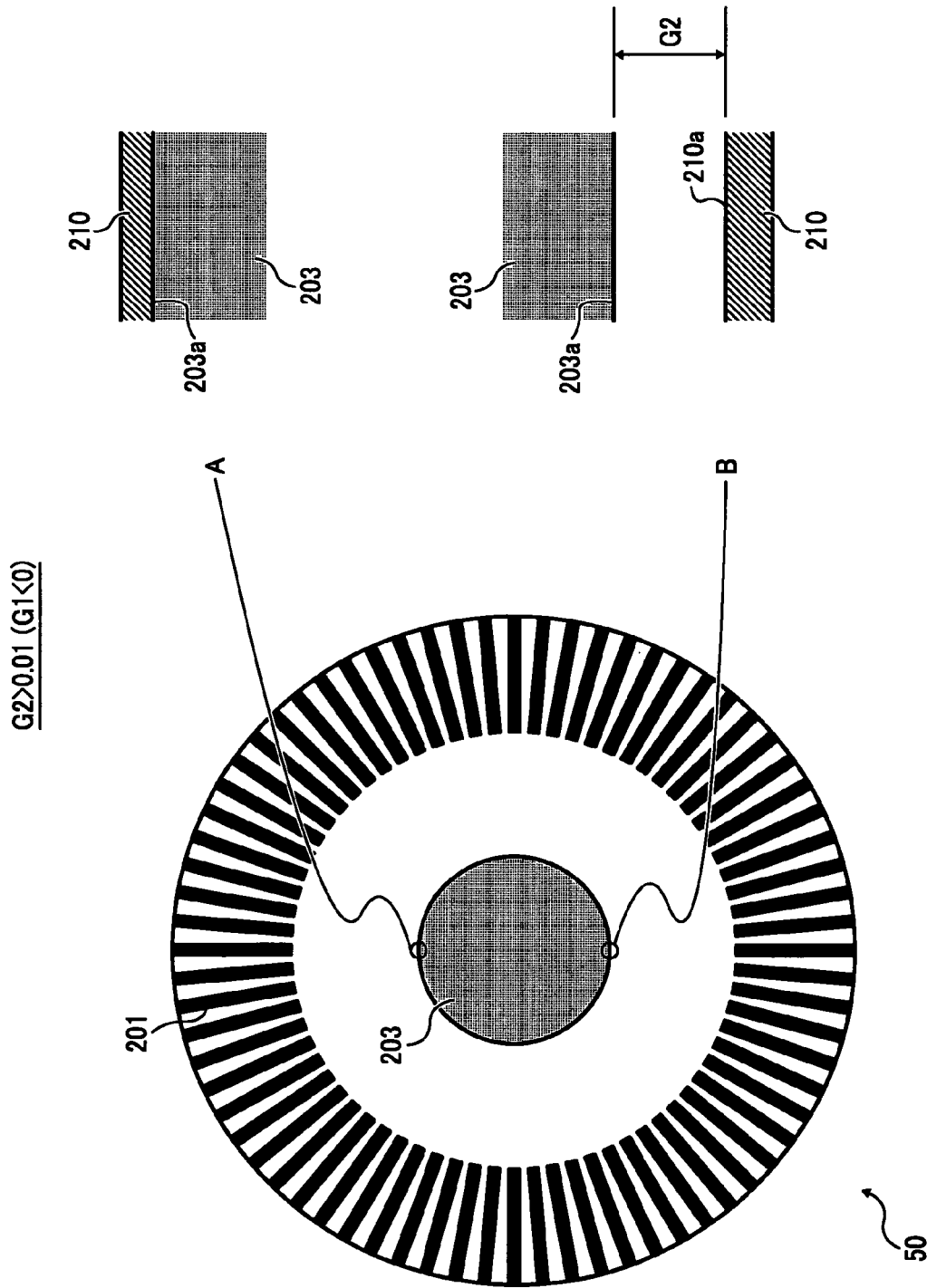

CODE WHEEL MANUFACTURING METHOD, CODE WHEEL, ROTARY ENCODER, ROTATION CONTROL UNIT, BELT CARRIER UNIT, AND IMAGE FORMING APPARATUS

CROSS REFERENCE TO RELATED APPLICATION

The present application is based on and claims priority from Japanese Patent Application No. 2008-102326, filed on Apr. 10, 2008, the disclosure of which is hereby incorporated by reference in its entirety.

BACKGROUND OF THE INVENTION

1. Field of the Invention

The present invention relates to a code wheel manufacturing method, a code wheel, a rotary encoder, a rotation control unit, and an image forming apparatus.

2. Description of the Related Art

In the prior art a rotary encoder for accurately measuring the rotation speed of a rotary member is well known. The rotary encoder is used to control the rotation speed of a rotary member such as a carrier roller for a belt, a storage medium, an ink nozzle head, or a photoreceptor in an image forming apparatus such as an electrophotographic or inkjet type printer, a photocopier, a facsimile machine, a printing machine or the like. An optical rotary encoder is configured to include an encode sensor and a code wheel (encoder disc) having a ring-like code portion (modified optical track) including a uniform, radial code pattern on an outer circumference. The code wheel is mounted on the rotary member so that it concentrically rotates with the rotary member, and the rotary encoder can accurately detect the rotation speed of the rotary member according to signals read from the code pattern of a rotating code wheel with the encode sensor. Such a rotary encoder is adapted to various rotation speed detectors and rotation control units owing to its compact size and accurate detectability. For example, Japanese Unexamined Patent Application Publication No. 2005-134763 discloses a feedback control method using a rotary encoder for the rotation speed of a rotary member as a carrier roller of a belt carrier unit of an image forming apparatus.

FIG. 8 shows an example of a code wheel of a prior art rotary encoder. A code portion 201 (modulated optical track) is formed with micron-level high precision by etching or photolithography. One of the key factors to determine performance of the rotary encoder is precision of intervals between codes of a code pattern of the code portion 201. However, it is generally considered that the code portion 201 can be precisely formed by etching or photolithography easily, and the precision is maintainable.

Another factor to determine accuracy of signals from a code pattern is a degree of coincidence (axial runout) between a center position of the ring-like code portion 201 and a rotational center thereof when the code wheel is mounted on the rotary member and rotated. Unless the code portion 201 is rotated around its graphical center, the rotation of the code pattern becomes distorted. This makes it impossible for the encoder sensor to accurately measure signals from the code pattern of the code portion 201, decreasing precision of the rotary encoder measuring the rotation speed. An axial runout over 100 μm generally causes a large problem in practical use; however, it is preferable that the axial runout is to be 10 μm or less for the purpose of precise measurement.

To maintain concentricity of the code portion and the rotary member (suppress the axial runout within a tolerance), mainly, two techniques are known. One is disclosed in Japanese Unexamined Patent Application Publication No. 2006-292724 that positions of a code wheel and a rotary member are adjusted by optically measuring the center positions of a code portion and the rotary member with an optical microscope, to fix the code wheel and the rotary member. Accordingly, the code wheel and the rotary member can be securely fixed with the axial runout within a tolerance so that a displacement in the rotation axes is unlikely to occur. The maintenance of the concentricity of the two members enables stable measurement of the rotation speed. However, there is a problem in this technique that it requires a great amount of process, time and cost for the adjustment. It also requires precisive positioning equipment, taking more cost and time.

The other technique is disclosed in Japanese Unexamined Patent Application Publication No. 2006-300871 that a hole is formed in the center of a code wheel to be coaxial with a rotary member and fit (occasionally, with pressure) with the shaft of the rotary member, thereby fixing the code wheel and the rotary member with each other. This technique does not require the positioning process for the axes of the code wheel and the rotary member, however, the formation of the hole in the code wheel has to be precisely done, requiring a lot of work and time to examine or measure precision of the hole.

A rotary encoder manufacturing method based on the second technique is described with reference to FIG. 8. FIG. 8 shows a prior art code wheel having a mark 202 in a ring form whose center position coincides with that of a code portion 201 (concentric circle of the circumference of the code portion 201). The code portion 201 and the mark 202 can be easily formed at a micron level precision by photolithography, etching or else with their center positions coinciding with each other. The mark 202 has a line width in reality but the outer and inner circumferences thereof are both formed in perfect circles with a high precision with the line width taken into consideration. In the prior art rotary encoder, an error of about 10 μm in deviation (axial runout) of the center positions of the code portion 201 of the code wheel and the rotary member is tolerable so that an error in the center positions of the mark 202 and the code portion 201 is not a big problem.

A hole 203 is formed independently from the code portion 201, generally after formation of the code portion 201. It is therefore not easy to make the center positions of the two coincide with each other at a micron level precision. It is necessary to examine a degree of coincidence (concentricity) of their center positions for the code wheel having the hole 203. Note that the center position of the hole 203 may be considered to be a center of rotation axis of the rotary member since both are coincident with each other.

For examining the concentricity of the hole 203 and the code portion 201, the mark 202 as an almost concentric circle of the code portion 201 is substituted for the code portion 201 since direct examination of the hole and the code portion is difficult. First, coordinates (X,Y) of three arbitrary points 204 on the circumference of the hole 203 are measured with a microscope having a coordinate measuring device or a projector to calculate the center position of the hole 203, for example. Likewise, coordinates (X, Y) of three arbitrary points 206 on the outer or inner circumference of the mark 202 are measured with a microscope or a projector to calculate the center position of the mark 202. The number of arbitrary points can be more than three. A deviation in the calculated center positions of the hole 203 and the mark 202 represents a displacement between the hole 203 and the mark 202 and a deviation (axial runout) between the center position of the code portion 201 and a rotation center of the rotary member with the rotary shaft fitted into the code wheel. Code wheels with the axial runout being over a tolerance are determined as defective products and removed while ones with the axial runout being within the tolerance are determined as standard products.

However, such a code wheel manufacturing method still has a problem that examining code wheels for the axial runout is very difficult since accurate positional measurement of at least six points and calculation of the center positions are required, taking a lot of time and cost. Further, a special device such as a coordinate measurable microscope or projector is needed for the measurement of the center positions. However, such a device is not generally provided in places such as work sites of component manufacturing, or assembly line, development or distribution of a rotary encoder or a product incorporating the rotary encoder, so that the examination is unfeasible in such work sites. Moreover, manipulating the device as a microscope or a projector requires specific skills and it is not something everyone can easily do.

In reality, there may be many occasions where the measurement of code wheels is needed at work sites as above, for example, when a problem occurs in a rotary encoder in an assembly line or at a customer's work site, it is needed to find out the cause of the problem, at a general inspection in a component manufacturing process, or in testing for precision of a component in the course of product development. Every time a problem is found in a component, the component in question has to be brought to an inspection department or the like which owns a coordinate measurable device, and examined by a skillful operator, which takes a tremendous time and costs to acquire a measurement result.

SUMMARY OF THE INVENTION

In view of solving the above problems, an object of the present invention is to provide a code wheel manufacturing method without a complex, time consuming hole forming process or a large-scale inspection process, a code wheel which can be examined in quality easily and is manufactured by the above manufacturing method, a rotary encoder incorporating such a code wheel, and a rotation control unit, a belt carrier unit and an image forming apparatus incorporating such a code wheel.

According to a first aspect of the present invention, a manufacturing method for a code wheel for a rotary encoder is provided. The code wheel comprises, in a central portion, a hole into which a rotary shaft of a rotary member is fitted and a code portion including a radial code pattern in a circumferential edge portion. The method comprises the steps of forming the code portion and a reference circle in a plate so that the reference circle has a radius larger than a radius of the hole by a tolerance of deviation between a center position of the code portion and a center position of the hole, and the reference circle has a same center as that of the code portion; and forming the hole in the plate in which the code portion and the reference circle are formed, so as to be contained in the reference circle.

In one features of the first aspect, the reference circle forming step comprises a step of forming a plurality of reference circles in accordance with a plurality of tolerances of the deviation, and the hole forming step comprises a step of selecting a reference circle from the plurality of reference circles in accordance with a predetermined tolerance of the deviation.

In the other features of the first aspect, among the plurality of reference circles, at least adjacent reference circles are formed in different colors.

In a second aspect of the present invention, a manufacturing method for a code wheel for a rotary member is provided. The code wheel comprises, in a central portion, a hole into which a rotary shaft of a rotary member is fitted and a code portion including a radial code pattern in a circumferential edge portion. The method comprises the steps of forming the code portion and a reference circle in a plate so that the reference circle has a radius larger than a radius of the hole by a tolerance of deviation between a center position of the code portion and a center position of the hole, and the reference circle has a same center of that of the code portion; and forming the hole in the plate in which the code portion and the reference circle are formed, so as to eliminate the reference circle.

In one features of the second aspect, the reference circle forming step comprises a step of forming a plurality of reference circles in accordance with a plurality of tolerances of the deviation, and the hole forming step comprises a step of selecting a reference circle from the plurality of reference circles in accordance with a predetermined tolerance of the deviation.

In the other features of the second aspect, among the plurality of reference circles, at least adjacent reference circles are formed in different colors.

According to a third aspect of the present invention, a code wheel is manufactured by either of the above manufacturing methods and comprises an indicator that the code wheel is manufactured by the manufacturing method.

According to a fourth aspect of the present invention, a code wheel for a rotary encoder comprises, in a central portion, a hole into which a rotary shaft of a rotary member is fitted; a code portion including a radial code pattern in a circumferential edge portion; and a reference circle having a same center as that of the code portion and having a radius larger than a radius of the hole by a tolerance of deviation between a center position of the code portion and a center position of the hole.

In one features of the fourth aspect, the reference circle is an outer circumference and/or an inner circumference of a ring having a width.

In the other features of the fourth aspect, the reference circle is formed intermittently in a circumferential direction.

According to a fifth aspect of the present invention, a rotary encoder comprises the above code wheel and an encoder sensor.

According to a sixth aspect of the present invention, a rotation control unit comprises the above rotary encoder measuring a rotation speed of the rotary member; and a feedback control mechanism controlling a rotation of the rotary member in accordance with the rotation speed measured by the rotary encoder.

According to a seventh aspect of the present invention, a belt carrier unit carries a member by moving a belt extending to the rotary member, and comprises the above rotation control unit.

According to an eighth aspect of the present invention, an image forming apparatus comprises the above belt carrier unit to carry a member on which an image is formed.

BRIEF DESCRIPTION OF THE DRAWINGS

FIG. 9 shows a detail of a code wheel according to a first embodiment and an enlarged periphery of a hole in FIG. 7;

FIG. 10 shows the code wheel when a displacement of a hole position is larger than that in FIG. 9;

DETAILED DESCRIPTION OF THE PREFERRED EMBODIMENT

Figure 1:
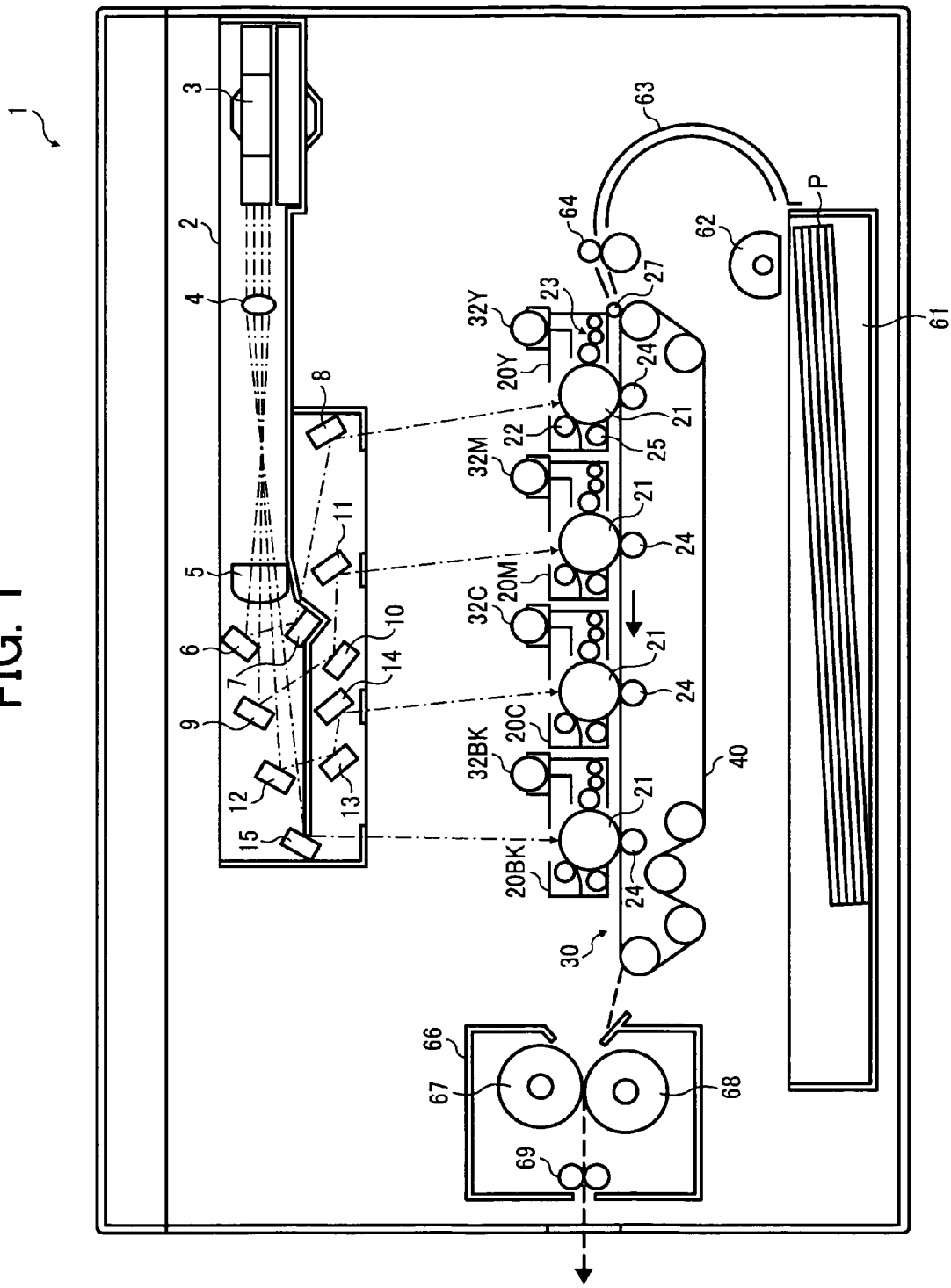
FIG. 1 shows the overall structure of one example of an image forming apparatus according to the present invention.

A code wheel according to the present invention is configured to include a code pattern on a circumferential edge portion and a hole in a center portion. The code wheel is fitted into a rotation shaft of a rotary member through the hole to concentrically rotate with the rotary member. The code wheel is a part of a rotary encoder which reads the rotation speed of the code pattern with an encoder sensor to measure the rotation speed of the rotary member. For this purpose, the code wheel according to the present invention comprises a hole in a center portion and a code portion which includes a radial, ring-like code pattern arranged in a circumferential edge portion. In order for the encoder sensor to accurately read the rotation speed of the code pattern of a rotating code portion, the radial, ring-like pattern needs to rotate around the center of the ring. With occurrence of a displacement (axial runout) in the center of the ring of the code portion and the center of the rotation, the encoder sensor cannot accurately read signals from the code pattern. The code wheel according to the present invention succeeds in suppressing an error in measurement of the rotation speed to a tolerance or less by suppressing, to a predetermined value or less, an amount of axial runout which is a deviation in the center position of the ring of the code portion and the rotation center.

The code wheel according to the present invention also comprises a reference circle. The code portion of the code wheel has a ring-like form so it can be seen as a circle and the circular hole has the same center as that of this circle (hereinafter, center of the code portion). A radius of the reference circle is larger than that of the hole by a tolerance of a deviation in the center positions of the hole and the code portion. That is, the code wheel according to the present invention includes the reference circle in a circumferential edge portion of the hole, and the center of the reference circle coincides with that of the ring-like code portion. The reference circle can be called as a concentric circle of the code portion. Ideally, this reference circle has the same center position as that of the hole and is also a concentric circle of the hole.

However, a displacement of the center positions of the reference circle and the hole within a tolerance does not cause a problem in practical use with a manufacture error taken into consideration. Since the reference circle of the code wheel has a radius larger than that of the hole by a tolerance of the displacement, the hole can be always contained in the reference circle. When the hole of the code wheel is not entirely contained in the reference circle, the displacement of their center positions exceeds a tolerance, so that the code wheel is considered as defective and is not a code wheel according to the present invention.

Note that this reference circle has a line width and is in a ring form. With the line width taken into account, the outer or inner circumference of the ring is preferably set to be a reference circle.

Further, the reference circle does not have to be a perfect circle. It can be a circle of a broken line intermittently formed in a circumferential direction, for example. In this case, an error will be slightly increased but it will not cause any significant problem in actual use.

Further, the hole should be preferably circular; however, it is not limited thereto. It can have a toothed circumferential edge, or a cutout or a convexity in a part of the circumferential edge. As understood from the above, the hole has to be circular enough for an operator to see a positional relation between the circumferential edge portion of the hole and the reference circle and to visually check that a distance between the center positions of the reference circle and the hole is within a tolerance.

A code wheel manufacturing method according to the present invention is to manufacture the above-described code wheel. The method comprises the steps of forming the code portion and the reference circle in a plate so that the reference circle has a radius larger than a radius of the hole by a tolerance of deviation between a center position of the code portion and a center position of the hole and has a same center as that of the code portion; and forming the hole in the plate in which the code portion and the reference circle are formed, so as to be contained in the reference circle.

The plate can be a plastic or metal sheet as one used in the prior art. The code portion and the reference circle can be easily formed concurrently by photolithography or etching with almost no displacement of the centers of the two. The reference circle is considered to be a concentric circle of the ring-like code portion, therefore, this step will be referred to as a concentric circle forming step.

In the hole forming step, the hole is formed so as to be contained in the reference circle on the plate. For increasing yield in the hole forming step, the hole can be formed using a prior art precisive positioning device with the centers of the reference circle and the hole matching with each other. For aiming to simplify manufacture equipment or speed up a manufacture process, the center positioning for the reference circle and the hole can be simply done, and instead the circumferential edge portion of the hole of the code wheel can be observed with a general microscope or a magnifying glass to check if the hole is contained in the reference circle. Code wheels with the hole partially shifted from the reference circle are ones with a large amount of axial runout so that they are to be removed as defective products.

In the concentric circle forming step, the number of reference circles can be one, however, it is not limited thereto. In a case where different levels of code wheels are manufactured according to a plurality of tolerances of deviation, a plurality of numbers of reference circles can be formed in accordance with the plurality of tolerances. And, in the hole forming step, a predetermined reference circle can be selected in accordance with a target level of the code wheel to form a hole within this reference circle. Also, after formation of the hole, about the circumferential edge portion of the hole can be observed with a general microscope or a magnifying glass, to classify the code wheel by level according to the reference circle containing the hole.

It is preferable to form the plurality of reference circles, at least adjacent ones, in different colors. This makes it easier to distinguish very closely formed reference circles, thereby enabling the hole formation or inspection easily and speedily.

The code wheel manufacturing method according to the present invention can be modified. This modified method is, as the above-described manufacturing method, to manufacture a code wheel for a rotary member which comprises in a central portion a hole into which a rotary shaft of a rotary member is fitted and comprises a code portion including a radial code pattern in a circumferential edge portion. The modified method comprises the steps of forming the code portion and a reference circle in a plate so that the reference circle has a radius smaller than a radius of the hole by a tolerance of deviation between a center position of the code portion and a center position of the hole and has a same center as that of the code portion; and forming the hole in the plate in which the code portion and the reference circle are formed, so as to eliminate the reference circle.

According to the modified manufacturing method, the reference circle formed in the concentric circle forming step is smaller in size than the hole, therefore, it is removed from the plate in the hole forming step. Thus, code wheels with no reference circle remaining on the circumferential edge of the hole in the plate are ones manufactured by this modified manufacturing method. Oppositely, code wheels with reference circles even partially remaining thereon are defective products. In this manner, defective code wheels are easily recognizable. The rest of this modified manufacturing method is the same as the above-mentioned manufacturing method.

It is also preferable that a plurality of reference circles are formed in the plate in accordance with a plurality of tolerances for axial runout and adjacent reference circles are formed in different colors. This makes it easier to select a reference circle according to a desired level of the code wheel or recognize the selected reference circle.

Further, it is preferable that code wheels manufactured by the manufacturing method according to the present invention are added an indicator that they are manufactured by such manufacturing method. Especially, in forming a hole in a code wheel after a reference circle smaller than the hole, the reference circle does not remain in the manufactured code wheel at all. Therefore, addition of such an indicator to the code wheel helps operators know that the code wheel is an accepted product from no reference circle remaining in the circumferential edge portion of the hole. The indicator can be in an arbitrary shape or form such as points or lines, text, a figure as circle, triangle, or the like, a product name, or a grade level.

In the following, a code wheel manufacturing method, a code wheel manufactured by the manufacturing method, a rotary encoder incorporating such a code wheel, a rotation control unit, and an image forming apparatus according to the present invention will be described with reference to the accompanying drawings.

FIG. 1 shows a color printer as one example of an image forming apparatus according to the present invention. The color printer comprises a body 1, an optical unit (write unit) 2 emitting laser light according to image information, process cartridges 20Y, 20M, 20C, 20BK in four colors (yellow, magenta, cyan, black), photoconductor drums 21 contained in the process cartridges 20Y, 20M, 20C, 20BK respectively, charge units 22 charging the photoconductor drums 21, develop units 23 developing electrostatic latent images on the photoconductor drums 21, transfer rollers 24 making in contact with the inner circumference of a transfer belt 40, a cleaning unit 25 collecting remnant toner on the photoconductor drums 21, a transfer belt unit 30 (belt carrier unit) including the transfer belt 40 to transfer toner images on the photoconductor drums 21 to paper P, toner supply units 32Y, 32M, 32C, 32BK supplying toner in the four colors to the develop units 23 of the process cartridges 20Y, 20M, 20C, 20BK, a paper feed unit 61 containing paper P, and a fuser unit 66 fusing images on the paper P.

The process cartridges 20Y, 20M, 20C, 20BK integrally hold image generating members such as the photoconductor drums 21, charge units 22, develop units 23, and cleaning units 25, respectively. Images in the four colors (yellow, magenta, cyan, black) are formed on the photoconductor drums 21 of the process cartridges 20Y, 20M, 20C, 20BK, respectively.

Next, general color image generation of the image forming apparatus is described. The four photoconductor drums 21 are rotated clockwise in FIG. 1. The surfaces of the photoconductor drums 21 are uniformly charged with the charge units 22 facing the drums (charge process). Then, having charged potentials, the surfaces of the photoconductor drums 21 are rotated to respective laser illumination positions.

An LD light source of the optical unit 2 emits a laser light in accordance with image signals for the four colors. The laser light is incident on a polygon mirror 3 and reflected thereby and then transmits through lenses 4, 5. Having transmitted through the lenses 4, 5, the laser light passes through different optical paths for the respective color components (exposure process).

A laser light for yellow component is reflected by mirrors 6 to 8 to illuminate the photoconductor drum 21 of the process cartridge 20Y. At the same time, the laser light is reflected by the polygon mirror 3 in high-speed rotation to scan the photoconductor drum 21 in a rotary axis direction (main scan direction). Thus, an electrostatic latent image for the yellow component is formed on the photoconductor drum 21 after charged with the charge unit 22.

Likewise, a laser light for magenta component is reflected by mirrors 9 to 11 to illuminate the photoconductor drum 21 of the process cartridge 20M. Thereby, an electrostatic latent image of the magenta component is formed thereon. A laser light for cyan component is reflected by mirrors 12 to 14 to illuminate the photoconductor drum 21 of the process cartridge 20C. Thereby, an electrostatic latent image of the cyan component is formed thereon. A laser light for black component is reflected by a mirror 15 to illuminate the photoconductor drum 21 of the process cartridge 20BK. Thereby, an electrostatic latent image of the black component is formed thereon.

The photoconductor drums 21 with the electrostatic latent images formed are further rotated to face the develop units 23, respectively. The develop units 23 supply toner in four colors to the photoconductor drums 21 to develop the latent images thereon (develop process).

After the develop process, the surface of each photoconductor drum 21 is rotated to face the transfer belt 40 whose inner circumference contacts with the transfer rollers 24 at respective positions. Then, paper P is carried to each transfer roller 24 by the transfer belt 40, and toner images in four colors on the photoconductor drums 21 are sequentially transferred onto the paper P (transfer process).

The transfer belt 40 is extended between a drive roller and a plurality of driven rollers, and driven by the drive roller in a direction indicated by an arrow in the drawing. The transfer belt unit 30 (belt carrier unit) incorporating the transfer belt 40 will be described in detail later.

After the transfer process, the surfaces of the photoconductor drum 21 are rotated to face the cleaning units 25 which collect remnant toner from the photoconductor drums 21 (cleaning process).

Then, the surface of each photoconductor drum 21 passes through a not-shown neutralization unit, which completes a series of image generation process.

Meanwhile, paper P is fed from the paper feed unit 61 via a paper feed roller 62, guided to a resist roller pair 64 through a carrier guide 63, and carried to a gap between the transfer belt 40 and an absorption roller 27 at a controlled timing.

Carried on the transfer belt 40 in the direction of the arrow in FIG. 1, the paper P passes on the four photoconductor drum 21 sequentially, whereby toner images in the four colors are superimposed on the paper P to form a color image.

Thereafter, the paper P with the color image formed thereon is separated from the transfer belt 40 and guided to the fuser unit 66 which fuses the color image on the paper P in a nip portion between a heat roller 67 and a pressure roller 68. Upon completion of the fuse process, the paper P is discharged as an image output to outside of the apparatus body 1. This completes a series of image forming process.

Figure 2:
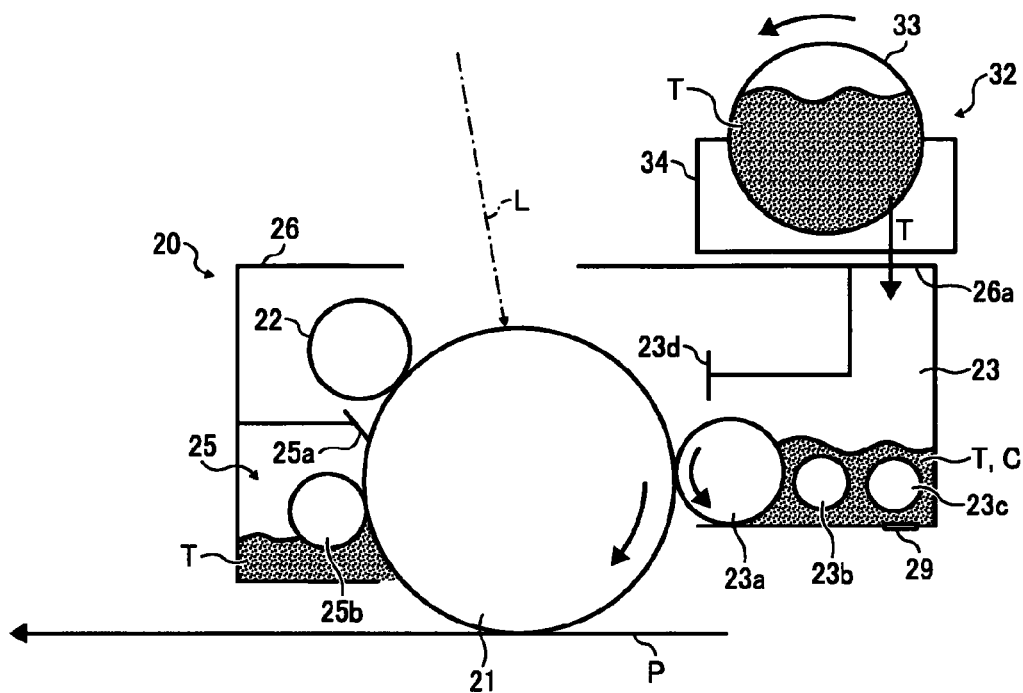
FIG. 2 shows a cross section of an image generator unit of the image forming apparatus in FIG. 1.

Next, a process cartridge as an image generator unit of the image forming apparatus is described in detail with reference to FIG. 2. Note that the four process cartridges and toner supply units provided in the apparatus body 1 have the same structure except for the color of toner T so that only one of them is shown in the drawing without the alphabetic codes (Y, M, C, BK). The process cartridge 20 in FIG. 2 mainly comprises the photoconductor drum 21, charge unit 22, develop unit 23, and cleaning unit 25 in a case 26 integrally. The develop unit 23 is comprised of a develop roller 23a, two agitation rollers 23b, 23c, a doctor blade 23d, a toner concentration sensor 29, and else, and it contains developer made of carrier C and toner T. The cleaning unit 25 is comprised of a cleaning blade 25a to contact with the photoconductor drum 21 and a cleaning roller 25b.

The image generation process is described in more detail. The develop roller 23a is rotated in a direction indicated by an arrow. Along with counterclockwise rotation of the agitation rollers 23b, 23c, toner T in the develop unit 23 and toner T supplied from the toner supply unit are mixed with carrier C. The toner T charged by friction and carrier C are supplied to the develop roller 23a by the agitation roller 23b. Toner T in a toner bottle 33 is supplied to the develop unit 23 from a supply port 26a appropriately in accordance with consumption of toner T in the develop unit 23. The toner concentration sensor 29 (permeability sensor) detects a degree of consumption of toner T in the develop unit 23.

The toner T on the develop roller 23a passes by the doctor blade 23d, reach a position opposite to the photoconductor drum 21 (develop area), and adhered to an electrostatic latent image on the surface of the photoconductor drum 21. Specifically, the toner T is adhered to the photoconductor drum 21 by an electric field generated due to a potential difference between a latent image of an area illumined with the laser light L and a develop bias applied by the develop roller 23a. Most of the toner T attached to the photoconductor drum 21 is transferred to the paper P, and remnant toner T is collected in the cleaning unit 25 by the cleaning blade 25a and cleaning roller 25b.

Figure 3:
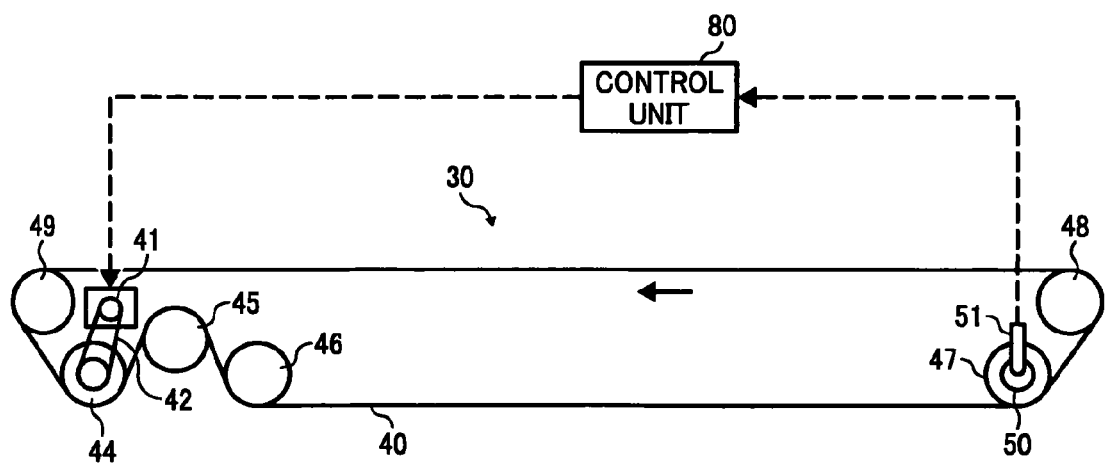
FIG. 3 shows a cross section of a belt carrier unit of the image forming apparatus in FIG. 1.
Figure 4:
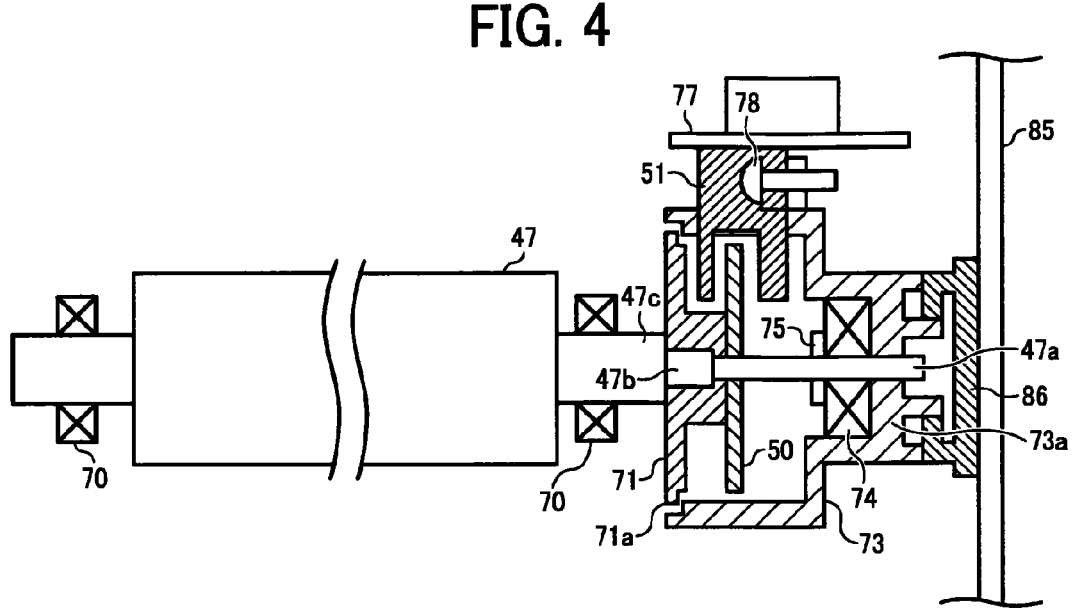
FIG. 4 shows a cross section of a roller of the belt carrier unit in FIG. 3.

Next, the structure and operation of the transfer belt unit 30 incorporating a rotary encoder according to the present invention is described with reference to FIGS. 3 to 7. FIG. 3 is a cross section of the transfer belt unit 30 (belt carrier unit). FIG. 4 is a cross section of a rotary encoder according to the present invention provided in the driven roller 47 of the transfer belt unit 30, in an axial direction of the rotary encoder.

In FIG. 3 the transfer belt unit 30 is comprised of the transfer belt 40, the drive roller 44 and the plurality of driven rollers 45 to 49 supporting the transfer belt 40, and a drive motor 41. A drive force of the drive motor 41 is transmitted to the drive roller 44 via a drive belt 42. Counterclockwise rotation of the drive roller 44 drives the transfer belt 40 wound on a part of the outer circumference of the drive roller 44 in a direction indicated by an arrow in the drawing. The driven rollers 45 to 49 contact with the transfer belt 40 and are rotated (driven) by the moving of the transfer belt 40 in the arrow direction.

Among the driven rollers 45 to 49, the driven roller 47 (rotary member) is integrated with the rotary encoder. In FIG. 4, the driven roller 47 is comprised of a roller portion contacting with the transfer belt 40 and shafts 47a to 47c. First bearings 70 are inserted into the shafts of both ends of the driven roller 47 so that the driven roller 47 is supported by the body of the transfer belt unit via the first bearings 70. Three shafts 47a to 47c with different diameters are formed on one side of the driven roller 47 (where the rotary encoder is mounted). The driven roller 47 can be made of stainless steel or the like.

In FIG. 4, the rotary encoder is comprised of a code wheel 50, a transmissive photosensor 51 (encoder sensor), a support plate 71, and a cover 73. The cover 73 is relatively, rotatably supported on the shaft 47a of the driven roller 47 via a second bearing 74. The second bearing 74 is a ball bearing and its outer diameter (outer ring) is pressed into a hole of the cover 73 and its inner diameter (inner ring) is inserted with the shaft 47a. The cover 73 integrated with the second bearing 74 is fitted with the driven roller 47 from the right side of the FIG. 4 and positioned (in an axial direction towards the support plate 50) in contact with a stopper ring 75 of the shaft 47a.

Axial end play of the cover 73 is eliminated by an engaging member 86 fixed to a side plate 85 of the transfer belt unit 30. The engaging member 86 is made of rubber material and engages with an end portion of the cover 73 fitted with the shaft 47a. A projection 73a of the cover 73 is fitted into a groove on the inner diameter of the engaging portion 86 to stop the rotation of the cover 73. And, the engaging member 86 biases the cover 73 towards the support plate 71, thereby eliminating the axial end play of the cover 73.

The cover 73 has an open end on the left side of FIG. 4 into which the support plate 71 is inserted with a small gap.

Above the cover 73 the transmissive photosensor 51 is mounted via a not-shown hole. The transmissive photosensor 51 fixed on a substrate 77 is mounted on the cover 73, using a nylon rivet 78 (resin rivet) after the code wheel 50, stopper ring 75, second bearing 74, and cover 73 are inserted in sequence into the shaft of the driven roller 47. Specifically, the photosensor 51 integrated with the substrate 77 is set up to the cover 73 from above to align a through hole of the cover 73 with a long hole of a holder portion of the photosensor 51. The photosensor 51 is adjusted vertically to determine a position and fixed on the cover 73 with the nylon rivet 78.

Figure 7:
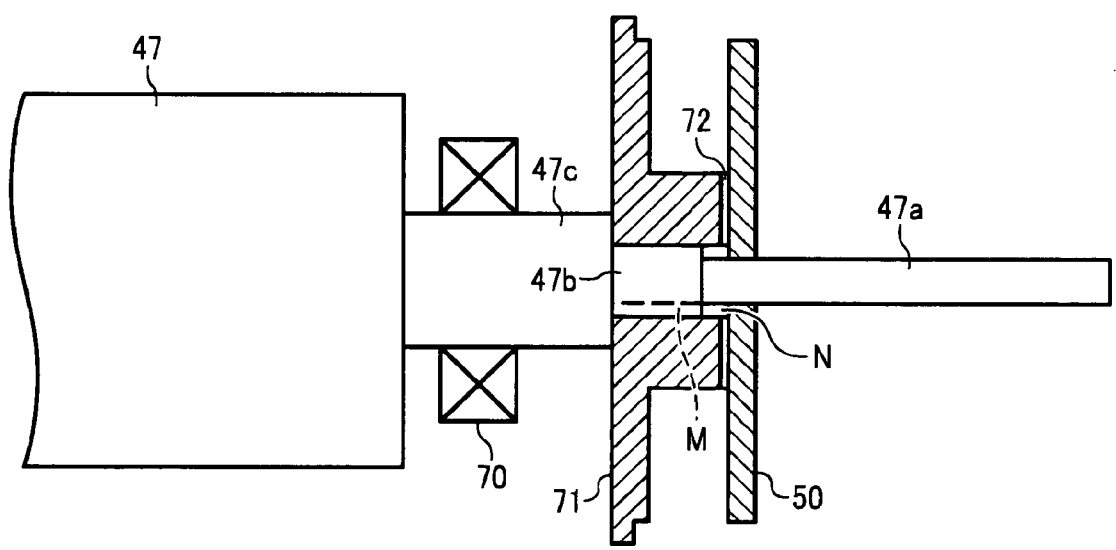
FIG. 7 is a partially enlarged view of the roller in FIG. 4.
Figure 8:
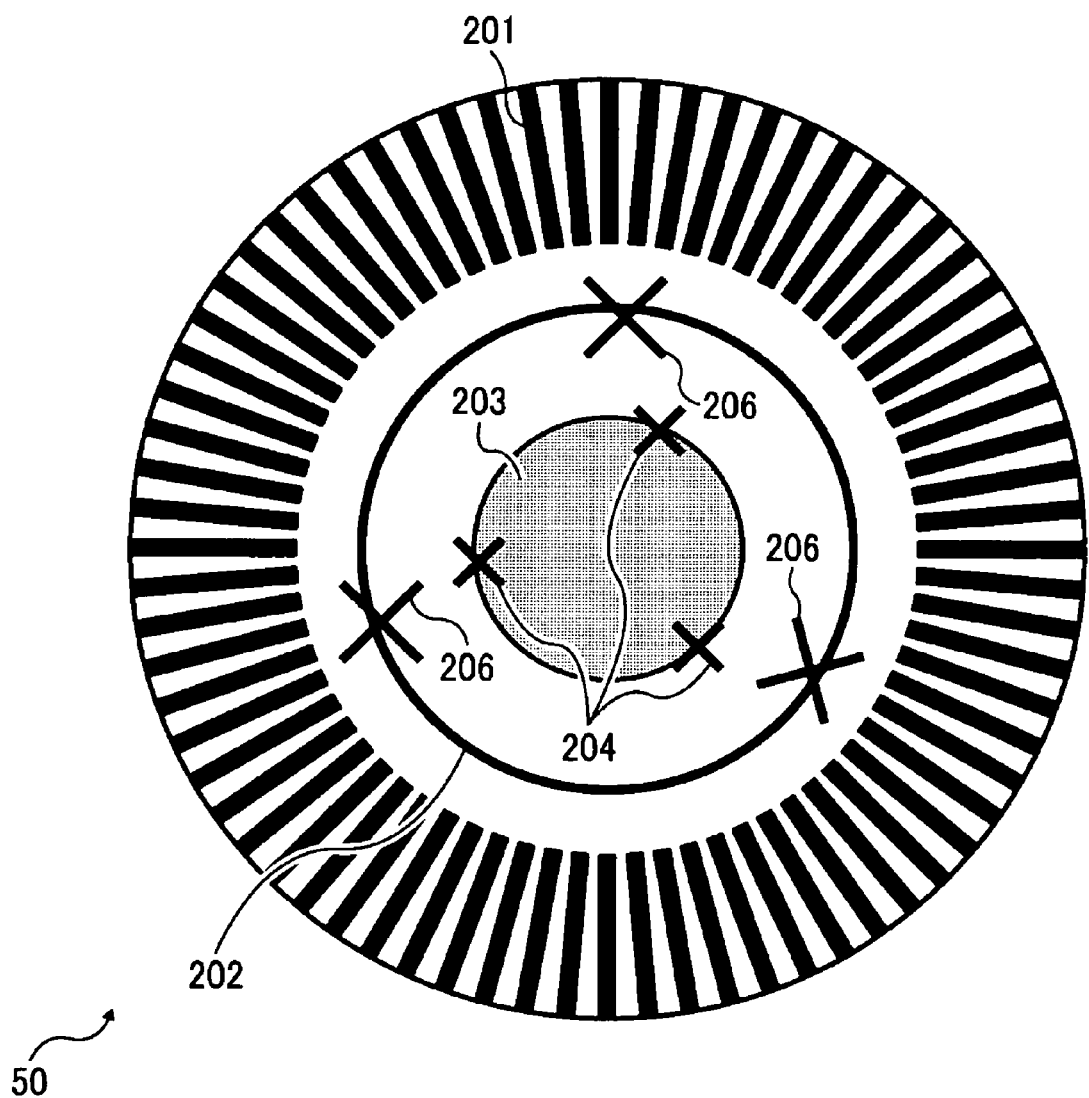
FIG. 8 is a detail view of a prior art code wheel.

The support plate 71 is made of rubber material as polyacetal, and lightly pressed into the shaft 47b (M as press-in area, N as non press-in area in FIG. 7). The position of the support plate 71 is determined in the axial direction by abutting with a step between the shafts 47b, 47c with different diameters.

Figure 5:
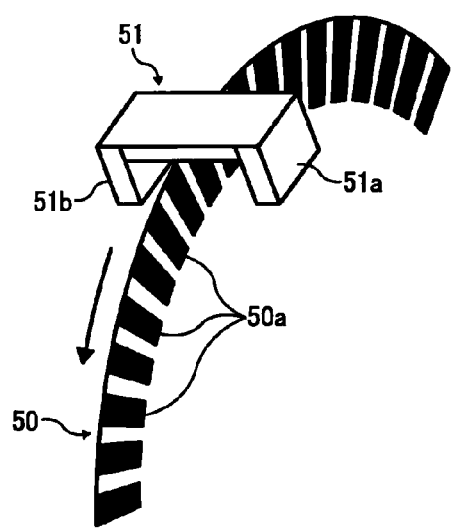
FIG. 5 is a perspective view of a part of a rotary encoder in the roller in FIG. 4.

The code wheel 50 is adhered to one side (opposite to press-in direction) of the support plate with a double stick tape (FIG. 7). The code wheel 50 is made of flexible material such as PET (polyethylene terephthalate) in thickness of about 0.2 mm and includes a radial code pattern 50a on an outer circumference of a principal surface (FIG. 5). That is, a code portion is formed of alternatively, circularly arranged light transmissive areas (slits) and non-light transmissive areas (code pattern 50a) on the code wheel 50. The code pattern 50a of the code wheel 50 can be formed by pattern drawing technique, for example, photolithography, photoresist or etching. The photosensor 51 detects the code pattern 50a on the code wheel 50 to detect fluctuation in rotation speed or angle of the driven roller 47 which is concentrically rotated with the code wheel 50 (support plate 71).

Further, the code wheel 50 is disposed so that its outer circumference is partially placed between a light emitting portion 51a (light emitting device) and a light receiving portion 51b (light receiving device) (FIG. 5). When the code pattern 50a (black portion) is present between the light emitting and receiving portions 51a, 51b, the light receiving portion 51b cannot receive light from the light emitting portion 51a and it outputs a high level. On the other hand, when the code pattern 50a (black portion) is not present between the light emitting and receiving portions 51a, 51b, the light receiving portion 51b receives light from the light emitting portion 51a and it outputs a low level. Thus, the photosensor 51 detects the rotation of the driven roller 47 (or the code wheel 50) based on a waveform interval of an encoder output signal (obtained by converting the output of the photosensor 51), as shown in FIG. 6.

Figure 6:
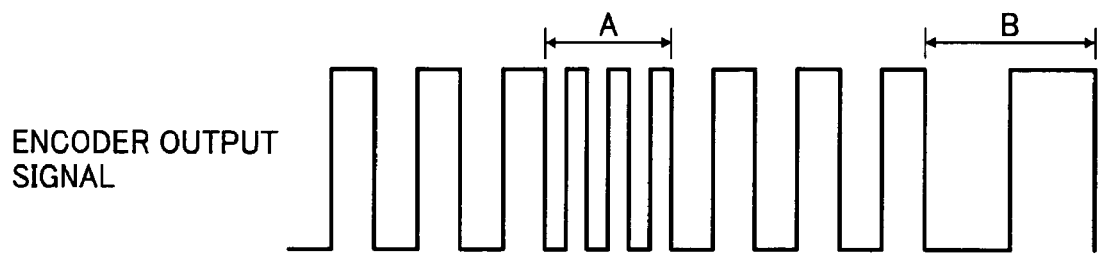
FIG. 6 shows a waveform of an output signal from the rotary encoder.

Specifically, based on a small waveform interval of the encoder output signal (area A in FIG. 6), a control unit 80 finds the rotation speed of the driven roller 47 (or code wheel 50) as fast while the control unit 80 finds the rotation speed of the driven roller 47 (or code wheel 50) as slow based on a large waveform interval of the encoder output signal (area B in FIG. 6). As shown in FIG. 3, the control unit 80 feeds back information on the rotation of the driven roller 47 to the drive motor 41. The control unit 80 accelerates drive speed of the drive motor 41 upon determining that the rotation speed of the driven roller 47 is slow. Oppositely, the control unit 80 decelerates the drive speed of the drive motor 41 upon determining that the rotation speed of the driven roller 47 is fast. This can stabilize the running speed of the transfer belt 40 of the transfer belt unit 30, thereby preventing color shifts in a color toner image formed of superimposed color toners.

In the following embodiments of the code wheel 50 will be described in detail.

First Embodiment

FIG. 9 shows the overall view of the code wheel 50 according to the present invention and enlarged view of points A, B on a circumferential edge portion 203a of a hole 203 (indicated by leading lines). The outer diameter of the code wheel 50 is set to 20 mm, and the diameter of the hole 203 is set to 4 mm (radius 2 mm). In the enlarged view A of FIG. 9, a ring-like mark 210 is partially shown. The diameter of the inner circumference 210a of the mark 210 is 4.02 mm (radius 2.01 mm), and the center position thereof coincides with that of a code portion 201 formed of a code pattern at a micron level precision. The code portion 201 and the mark 210 are concurrently formed by pattern drawing technique such as photolithography, photoresist, or etching.

The hole 203 is formed after the code portion 201 and mark 210 so that its center position coincides with that of the code portion 201 and the inner circumference of the mark 210. With the center positions of the two precisely coincident, gaps G1, G2 between the circumferential edge portion 203 of the hole 203 and the inner circumference of the mark 210 will be 0.01 mm (tolerance). However, the gap G1 is smaller than the gap G2 as shown in the enlarged views A, B of FIG. 9. That is, the center position of the hole 203 is displaced upward from that of the inner circumference of the mark 210.

Further, in FIG. 9 the smaller gap G1 is larger than zero. Accordingly, a displacement of the center positions between the hole 203 and the inner circumference of the mark 210 is smaller than 0.01 mm (tolerance). Now, FIG. 10 shows the code wheel 50 with the displacement of 0.01 mm or more. In FIG. 10 there is no gap G1 (G1<0), and the gap G2 is larger than 0.01 mm. The displacement of the center positions between the hole 203 and the inner circumference of the mark 210 is larger than 0.01 mm and exceed a tolerance of the displacement (axial runout) of the center positions. In the present embodiment, only two vertical points on the circumferential edge portion 203a of the hole 203 are measured, however, it is preferable that a larger number (three or more) of points are measured on the entire circumference of the circumferential edge portion 203a or evenly divided portions of the circumferential edge portion 203a.

The present embodiment describes an example of controlling the displacement to be smaller than 0.01 mm for the purpose of preventing color shifts in a color toner image. It is possible to easily determine whether or not the displacement is less than 0.01 mm by checking the periphery of the inner circumference and the entire circumference of the hole 203 with a magnifying glass to see if there is a gap G1 or G2 (G1, G2>0). That is, the code wheel in FIG. 9 with the displacement being less than 0.01 mm is determined to be an acceptable product while that in FIG. 10 with the displacement being 0.01 mm or more is determined to be an unacceptable product. Also, it is possible to find a direction of the displacement.

Since the code portion 201 and the mark 210 are precisely formed to have the same center position as described above, it is possible to determine, from a result of the above displacement determination, amount and direction of the displacement of the center positions of the code portion 201 and the hole 203.

In accordance with a level of required precision of the center positions, the diameter of the inner circumference of the mark 210 can be changed such that the higher the level of precision, the smaller the diameter. Generally, a tolerance of displacement for the code wheel of a rotary encoder for use in a belt carrier unit of an image forming apparatus is required to be 0.1 mm or less. Accordingly, the diameter of the inner circumference of the mark 210 need be set to 4.2 mm (radius 2.1 mm) or less which is slightly larger than that of the hole 203 (+0.2 mm or less in diameter).

Figure 11A:
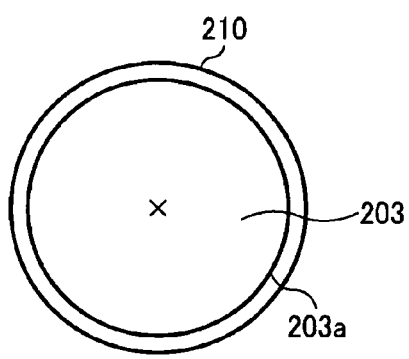
FIGS. 11A, 11B show a first example of a hole of the code wheel according to the present invention.
Figure 11B:
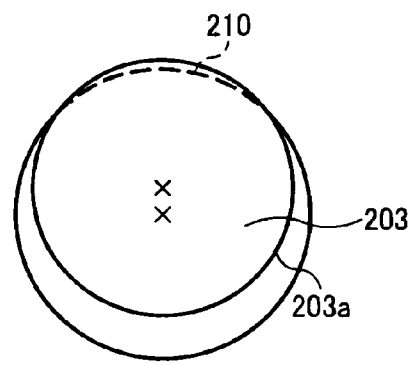

Next, a relation between the circumferential edge portion 203a of the hole 203 and the mark 210 in the code wheel according to the present invention is described with reference to FIGS. 11A, 11B, 12A, 12B. In FIGS. 11A, 11B the mark 210 is drawn with a very thin line and a line width thereof seems negligible; however, the mark 210 is an inner or outer circumference of a circle with a line width. The code wheel in FIG. 11A is an acceptable product according to the present invention since the hole 203 is contained in the mark 210 and there is a gap between the circumferential edge portion 203a of the hole 203 and the mark 210 around the enter circumferences. In contrast, the code wheel in FIG. 11B is an unacceptable product according to the present invention since the hole 203 is not contained in the mark 210, the mark 210 is partially cut off by the hole 203 and the gap between the circumferential edge portion 203a and the mark 210 is partially eliminated.

Figure 12A:
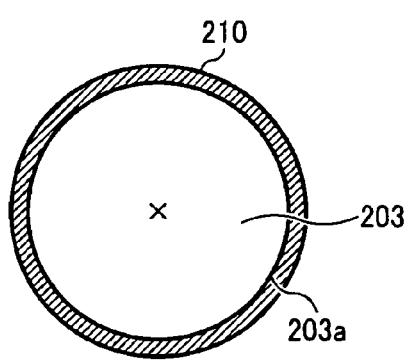
FIGS. 12A, 12B show a second example of a hole of the code wheel according to the present invention.
Figure 12B:
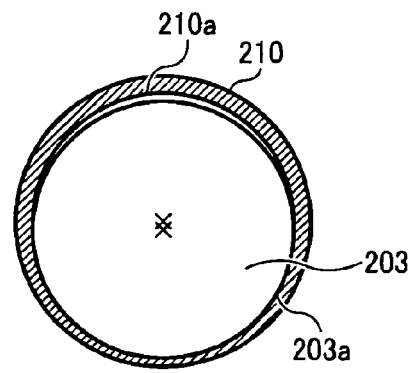

FIGS. 12A, 12B show the mark 210 being the outer circumference of a circle with a line width. The code wheel in FIG. 12A is an acceptable product according to the present invention since the hole 203 is contained in the mark 210 and there is a gap (line width) between the circumferential edge portion 203a of the hole 203 and the mark 210 (outer circumference) around the entire circumferences. The inner circumference of the circle with a line width coincides with the circumferential edge portion 203a of the hole 203. Regarding the code wheel in FIG. 12B, the hole 203 is contained in the mark 210 as the outer circumference and there is a gap between the circumferential edge portion 203a of the hole 203 and the mark 210 but there is also a gap between a part of an inner circumference 210a of the circle and the circumferential edge portion 203a. In this case, however, the outer circumference of the circle is the mark 210 so that this code wheel is also considered as an acceptable product according to the present invention because of the gap between the circumferential edge portion 203a and the mark 210 around the entire circumferences. Note that a difference in radius between the outer circumference of the circle and the hole 203 is set to a tolerance for axial runout.

Figure 13:
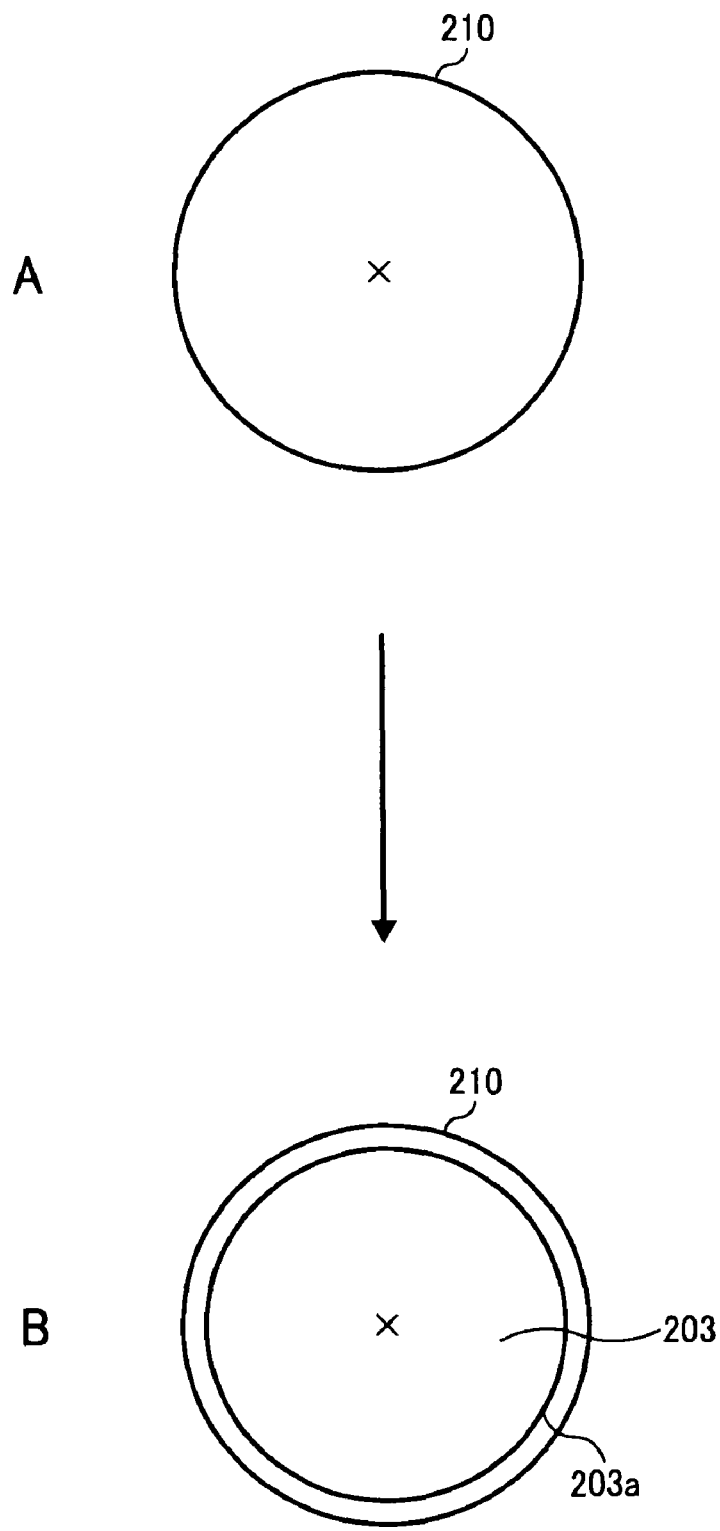
FIG. 13 shows a first example of forming a hole of the code wheel according to the present invention.

FIG. 13 shows an example of how to form the hole 203 in the code wheel of FIG. 11A. As shown in A of FIG. 13, the circular mark 210 (reference circle) is formed so as to have the same center point as that of a not-shown code portion 201 and a radius smaller than that of the hole 203 by a tolerance of a deviation in the center positions between the code portion 201 and the hole 203. Then, the hole 203 is formed to be contained in the mark 210 as shown in B of FIG. 13. For formation of the hole 203, the hole 203 can be precisely formed to be within the mark 210, or it can be roughly formed and then a code wheel having the hole 203 within the mark 210 can be selected using a magnifying glass or the like.

Figure 14:
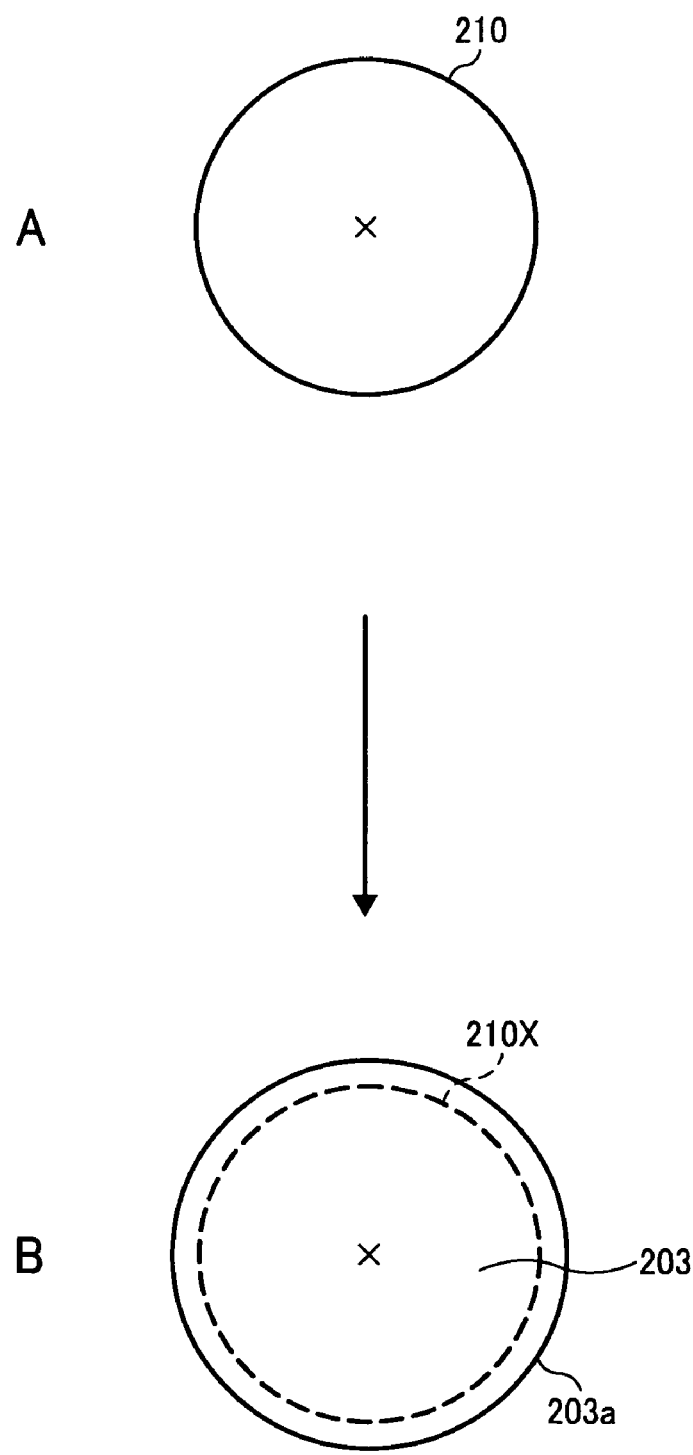
FIG. 14 shows a second example of forming a hole of the code wheel according to the present invention.

FIG. 14 shows another example of a code wheel manufacturing method according to the present invention. In a code wheel manufactured by this method the mark 210 (reference circle) is not present near the circumferential edge portion of the hole 203. As shown in A of FIG. 14, the circular mark 210 (reference circle) is formed so as to have the same center point as that of a not-shown code portion 201 and a radius smaller than that of the hole 203 by a tolerance of a deviation in the center positions between the code portion 201 and the hole 203. Then, the mark 210 is formed to be contained in the hole 203 as shown in B of FIG. 14. For formation of the hole 203, the hole 203 can be precisely formed to be within the mark 210, or after formation of the hole 203a, a code wheel with no mark 210 remaining near the circumferential edge portion 203a of the hole 203 can be selected using a magnifying glass or the like. Code wheels with the mark 210 remaining near the circumferential edge portion 203a even partially are unacceptable products. It is preferable that an indicator (for example, *) may be added to a code wheel at a position not to be eliminated by the hole 203 in order to indicate that the code wheel is manufactured by the manufacturing method according to the present invention. This makes easier to distinguish acceptable products by just seeing the indicator and no remaining mark 210. Without the indicator, after distribution it is not able to distinguish acceptable products from other code wheels with no mark 210 manufactured by any other manufacturing method.

Figure 15:
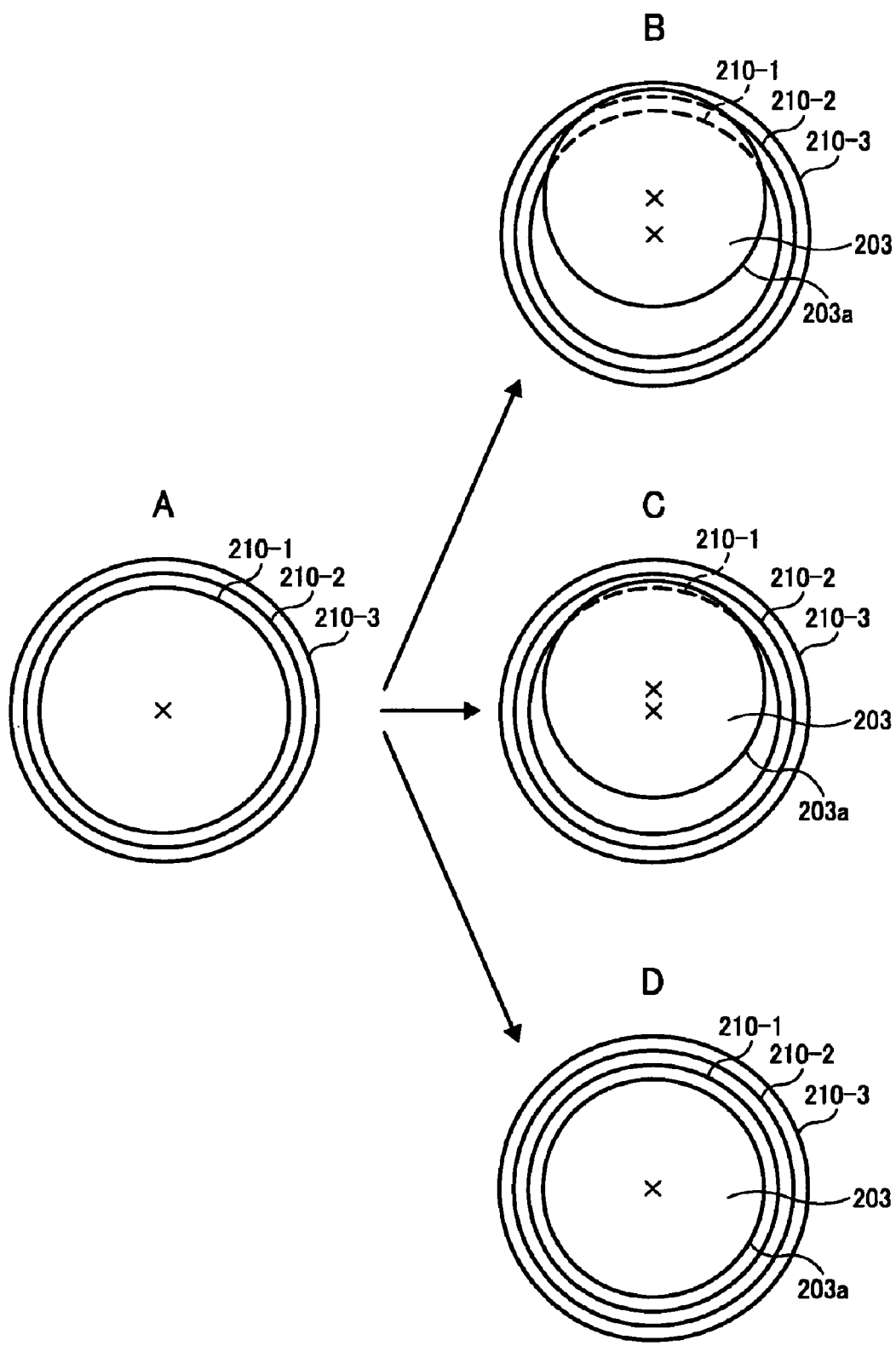
FIG. 15 shows a third example of forming a hole of the code wheel according to the present invention.

FIG. 15 shows an example of manufacturing method for a code wheel having concentric circles, marks (reference circles) 210-1, 210-2, 210-3. In A of FIG. 15, the marks 210-1, 210-2, 210-3 have the same center point as that of the code portion 201 (not shown), and have radiuses larger than that of the hole 203 by three kinds of tolerances of deviation in the center positions between the code portion 201 and the hole 203. The three kinds of tolerances are set in accordance with three levels of axial runout of a code wheel. B, C, D of FIG. 15 are acceptable code wheels with holes 203 formed by the method in FIG. 13. The hole 203 of the code wheel D of FIG. 15 is contained in the mark 210-1 and corresponds with a smallest tolerance of the three tolerances. Accordingly, it is most precisely formed code wheel with least axial runout of the code portion 201 among the three. The hole 203 of the code wheel C of FIG. 15 is partially overlapped with the mark 210-1 and corresponds with a medium level tolerance of the three tolerances. Accordingly, it is a code wheel with medium level axial runout of the code portion 201. The hole 203 of the code wheel B of FIG. 15 is partially overlapped with the mark 210-2 and corresponds with a largest tolerance of the three tolerances. Accordingly, it is a code wheel with largest axial runout of the code portion 201. The code wheel B is also an acceptable product with axial runout within the third tolerance.

Second Embodiment

Figure 16:
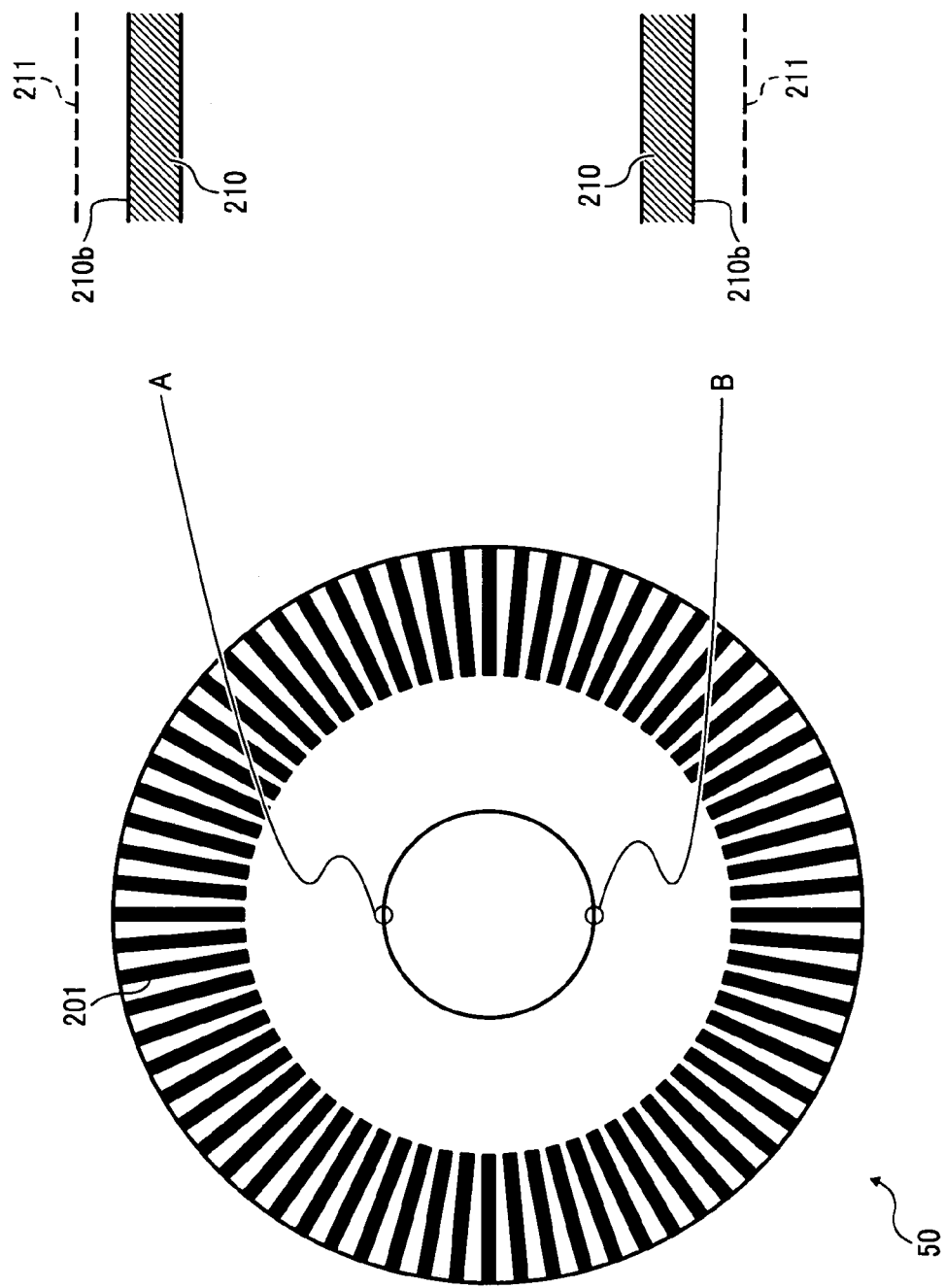
FIG. 16 shows a code wheel before a hole is formed according to a second embodiment of the present invention.

The second embodiment of the present invention is described with reference to FIGS. 16 to 18. The present embodiment is different from the first embodiment in size of the mark 210 of the code wheel 50. FIG. 16 shows the overall view of the code wheel 50 before the hole 203 is formed and enlarged views of points A, B (indicated by leading lines). The outer diameter of the code wheel 50 is set to 20 mm, and the diameter of the hole 203 to be formed is set to 4 mm (radius 2 mm). A target position of the circumferential edge portion 203 of the hole 203 is indicated by a broken line 211 and a ring-like mark 210 is shown in the enlarged views. The diameter of an outer circumference 210b of the mark 210 is 3.98 mm (radius 1.99 mm), and the center position thereof coincides with that of the code portion 201 at a micron level precision. The code portion 201 and the mark 210 are concurrently formed by pattern drawing technique such as photolithography, photoresist, or etching. After formation of the code portion 201 and the mark 210, the hole 203 is formed so that its center position coincides with that of the code portion 201 and the mark 210.

Figure 17:
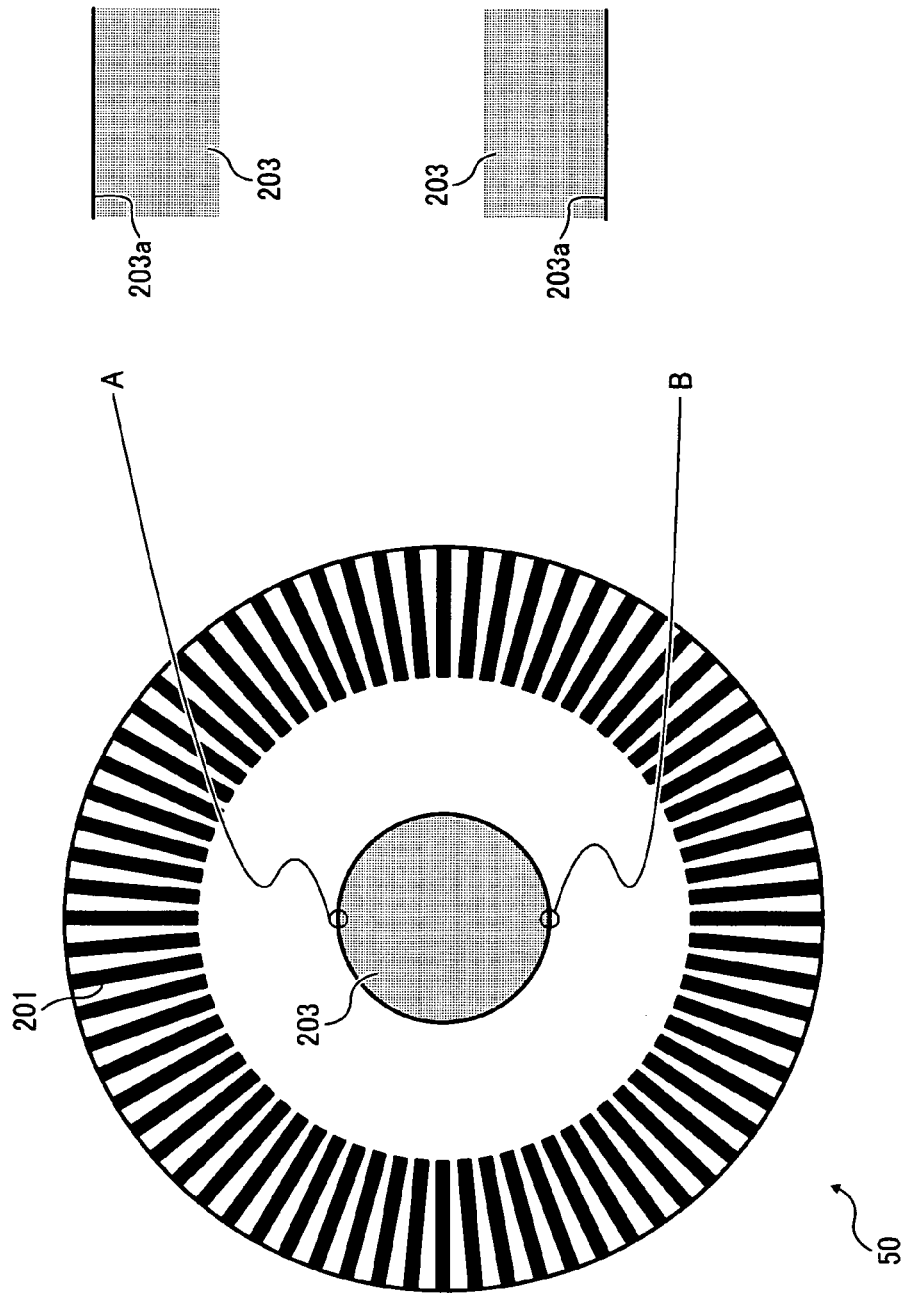
FIG. 17 shows the code wheel according to the second embodiment of the present invention.
Figure 18:
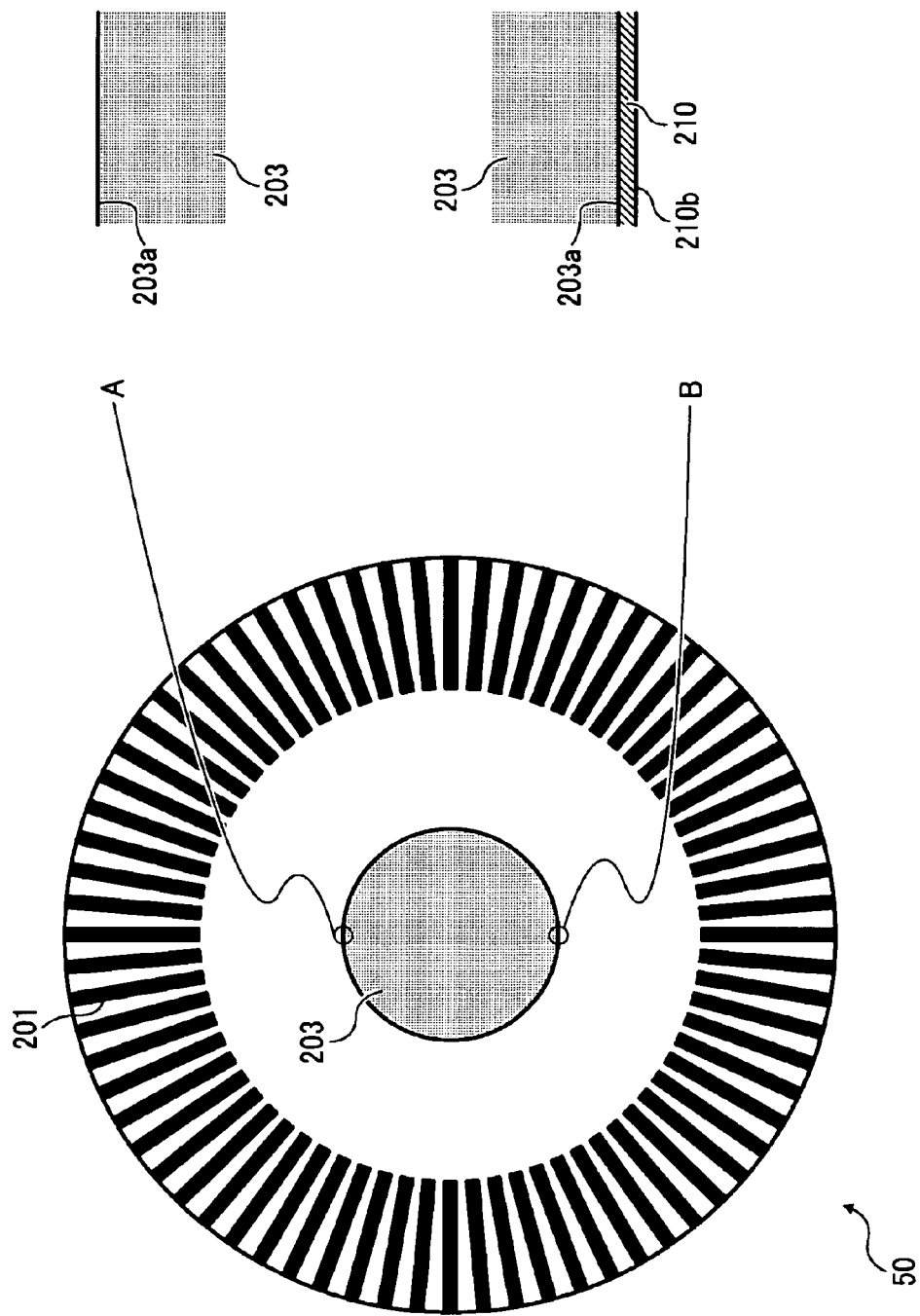
FIG. 18 shows the code wheel when a displacement of a hole position is larger than that in FIG. 17.

FIG. 17 shows the code wheel 50 after the hole 203 is formed and enlarged views of points A, B of the circumferential edge portion 203a. It is seen from the enlarged views that the mark 210 is eliminated. The entire outer circumference of the mark 210 will be eliminated when displacement of the center positions between the hole 203 and the mark 210 is less than 0.01 mm. FIG. 18 shows the code wheel 50 with the displacement of the center positions being 0.01 mm or more. As seen in the enlarged view of point B, the mark 210 is present because the center position of the hole 203 is displaced from that of the outer circumference of the mark 210 by 0.01 mm or more in an upward direction in FIG. 18. Accordingly, this code wheel 50 is determined to be an unacceptable product according to the manufacturing method of the present invention.

Thus, it is possible to determine the displacement to be less than 0.01 mm by simply checking that the mark 210 is eliminated all around the inner circumference of the hole 203 using a magnifying glass or the like. With the displacement being 0.01 mm or more, a direction of the displacement can be also determined.

Since the code portion 201 and the mark 210 are precisely formed to have the same center position as described above, it is possible to determine, from a result of the above displacement determination, amount and direction of the displacement of the center positions of the code portion 201 and the hole 203.

In accordance with a level of required precision of the center positions, the diameter of the outer circumference of the mark 210 can be set such that the higher the level, the larger the diameter. Generally, a tolerance of the above displacement is required to be less than 0.1 mm. Accordingly, the diameter of the outer circumference of the mark 210 need be set to 3.8 mm (radius 1.9 mm) or more which is slightly smaller than that of the hole 203 (−0.2 mm or less in diameter).

Figure 19:
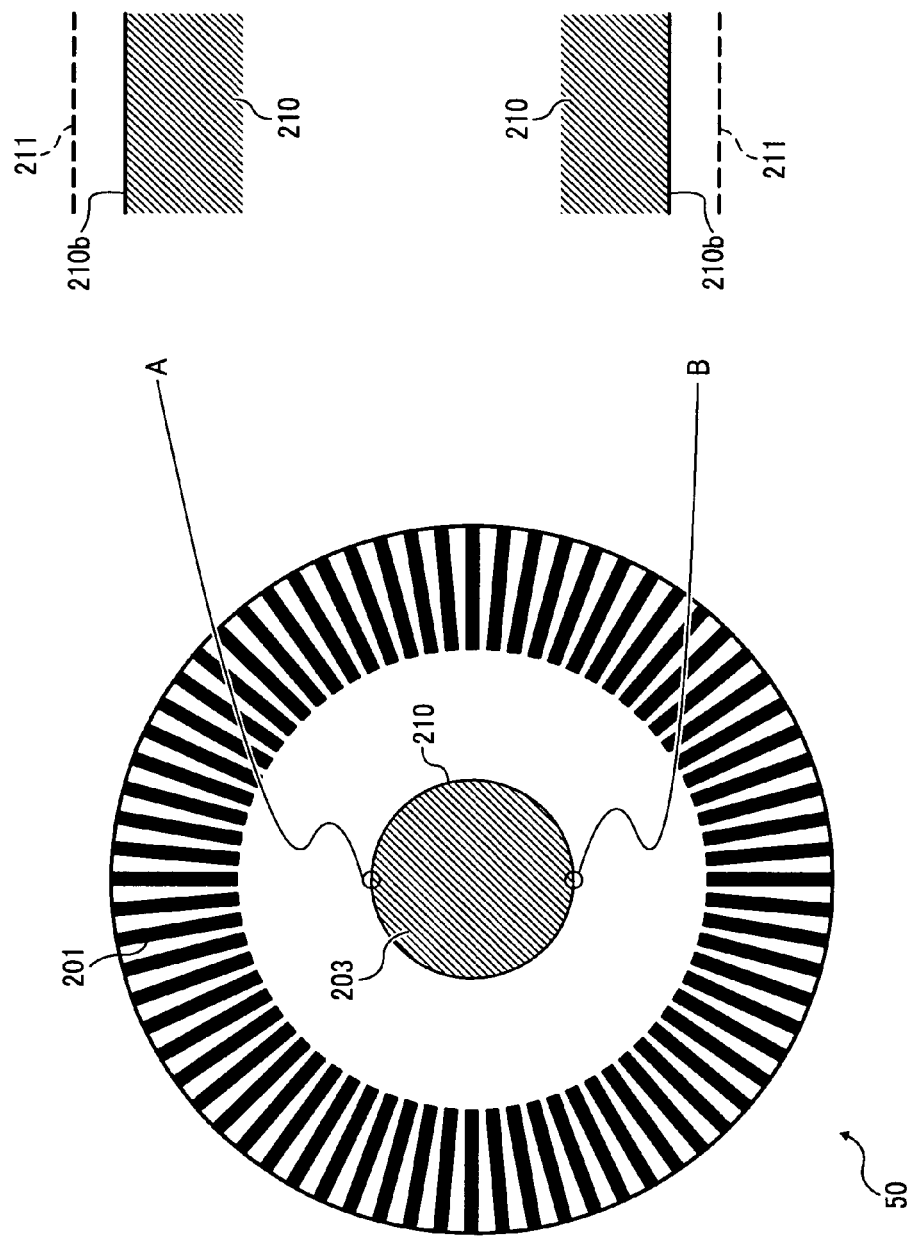
FIG. 19 shows a similar code wheel to that of FIG. 16 before a hole is formed.

In the present embodiment, the diameter of the inner circumference of the mark 210 can be set to 0 mm (with no inner circumference) as shown in the code wheel 50 before formation of the hole 203 in FIG. 19. The code wheel 50 after the formation of the hole 203 will be the same as that in FIGS. 17, 18.

Third Embodiment

Figure 20:
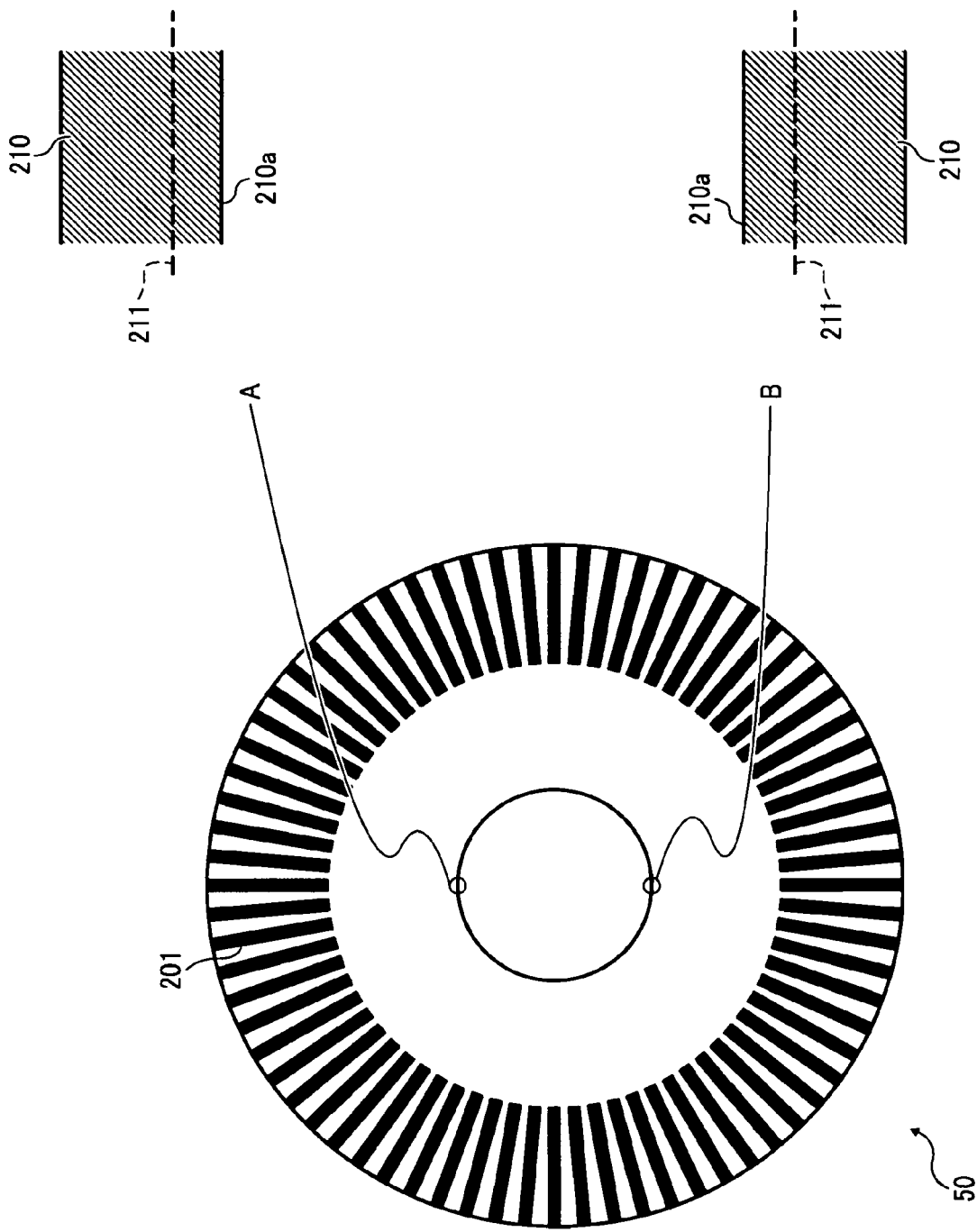
FIG. 20 shows a code wheel before a hole is formed according to a third embodiment of the present invention.

A code wheel 50 according to the third embodiment of the present invention is described with reference to FIGS. 20 to 22. The present embodiment is different from the first embodiment in size of the mark 210 of the code wheel 50. FIG. 20 shows the overall view of the code wheel 50 before the hole 203 is formed and enlarged views of points A, B. The outer diameter of the code wheel 50 is set to 20 mm, and the diameter of the hole 203 to be formed is set to 4 mm (radius 2 mm). A target position of the circumferential edge portion 203a of the hole 203 is indicated by a broken line 211 and a ring-like mark 210 is shown in the enlarged views. The diameter of an inner circumference 210a of the mark 210 is 3.98 mm (radius 1.99 mm), and the center position thereof coincides with that of the code portion 201 at a micron level precision. The code portion 201 and the mark 210 are concurrently formed by pattern drawing technique such as photolithography, photoresist, or etching. After formation of the code portion 201 and the mark 210, the hole 203 is formed so that its center position coincides with that of the code portion 201 and the mark 210.

Figure 21:
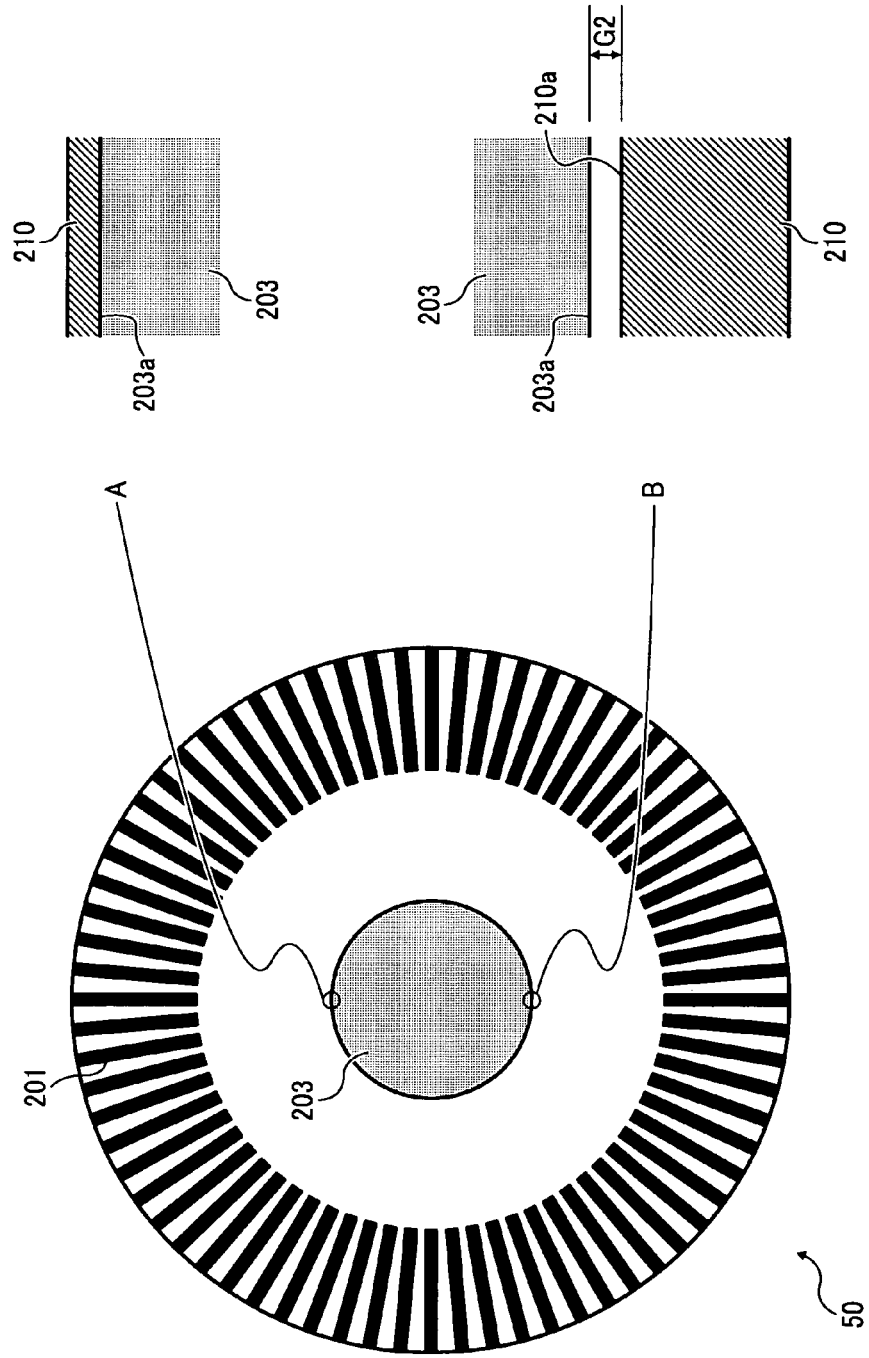
FIG. 21 shows the code wheel according to the third embodiment.
Figure 22:
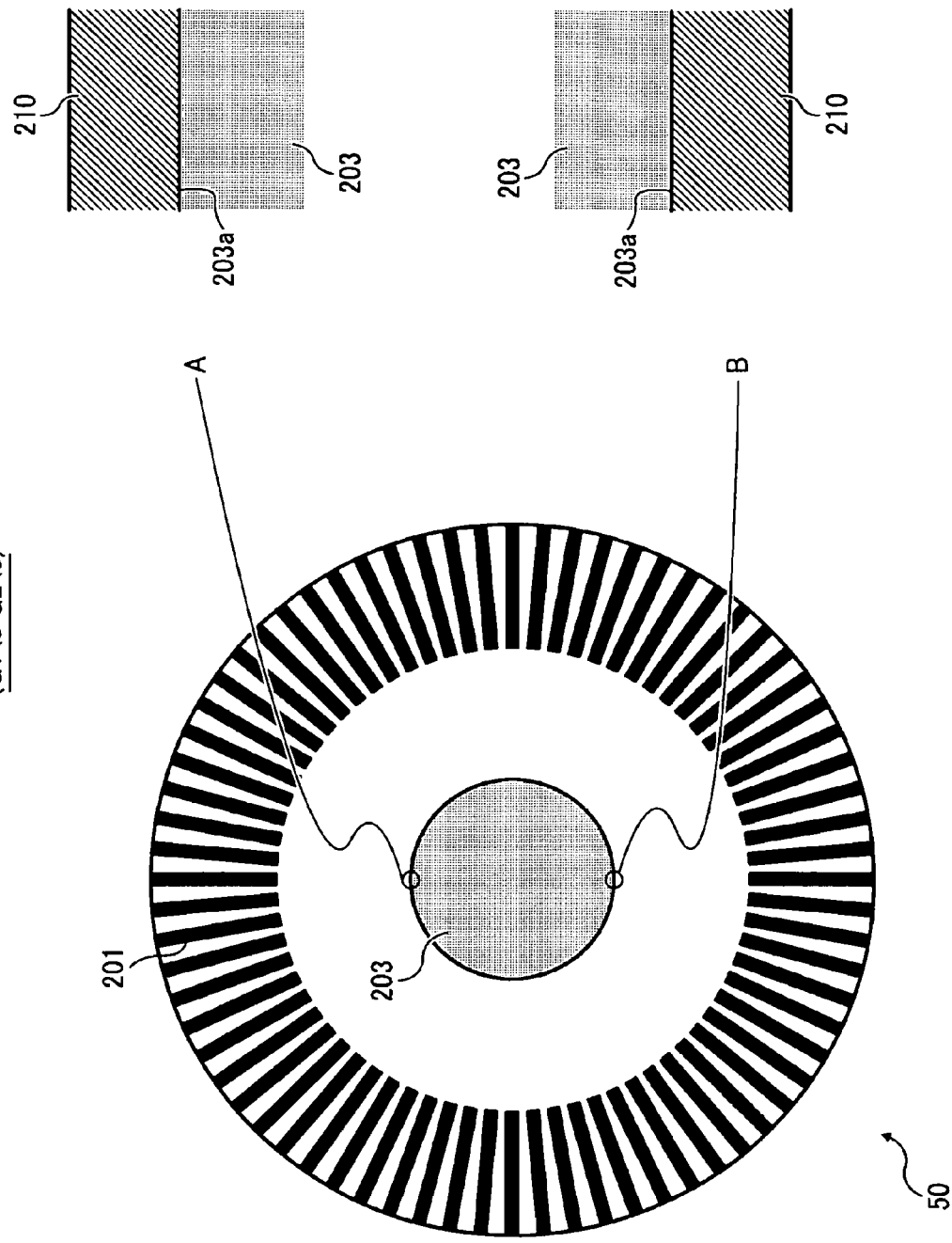
FIG. 22 shows the code wheel when a displacement of a hole position is smaller than that in FIG. 21.

FIG. 21 shows the code wheel 50 after the hole 203 is formed and enlarged views of points A, B of the circumferential edge portion 203a. It can be seen from the enlarged view of point B that there is a gap G2 between the circumferential edge portion 203a of the hole 203 and the inner circumference 210a of the mark 210. But, there is no gap in the enlarged view of point A. With a displacement being 0.01 mm or more between the center positions of the hole 203 and the inner circumference of the mark 210, a gap will occur near the circumferential edge portion 203a of the hole 203. FIG. 21 shows that the center position of the hole 203 is displaced from that of the inner circumference of the mark 210 by 0.01 mm or more in an upward direction in FIG. 21. With the displacement being less than 0.01 mm, there will be no gap as shown in FIG. 22.

Thus, it is possible to determine the displacement to be less than 0.01 mm by simply checking around the entire circumference of the hole 203 that the gap G2 or G1 is present (G1, G2>0). With the displacement being 0.01 mm or more, a direction of the displacement can be determined.

Since the code portion 201 and the mark 210 are precisely formed to have the same center position as described above, it is possible to determine, from a result of the above displacement determination, amount and direction of the displacement of the center positions of the code portion 201 and the hole 203.

In accordance with a level of required precision of the center positions, the diameter of the inner circumference of the mark 210 can be set such that the higher the level, the larger the diameter. Generally, a tolerance of the above displacement is required to be less than 0.1 mm. Accordingly, the diameter of the outer circumference of the mark 210 need be set to 3.8 mm (radius 1.9 mm) or more which is slightly smaller than that of the hole 203 (−0.2 mm or less in diameter).

Fourth Embodiment

Figure 23:
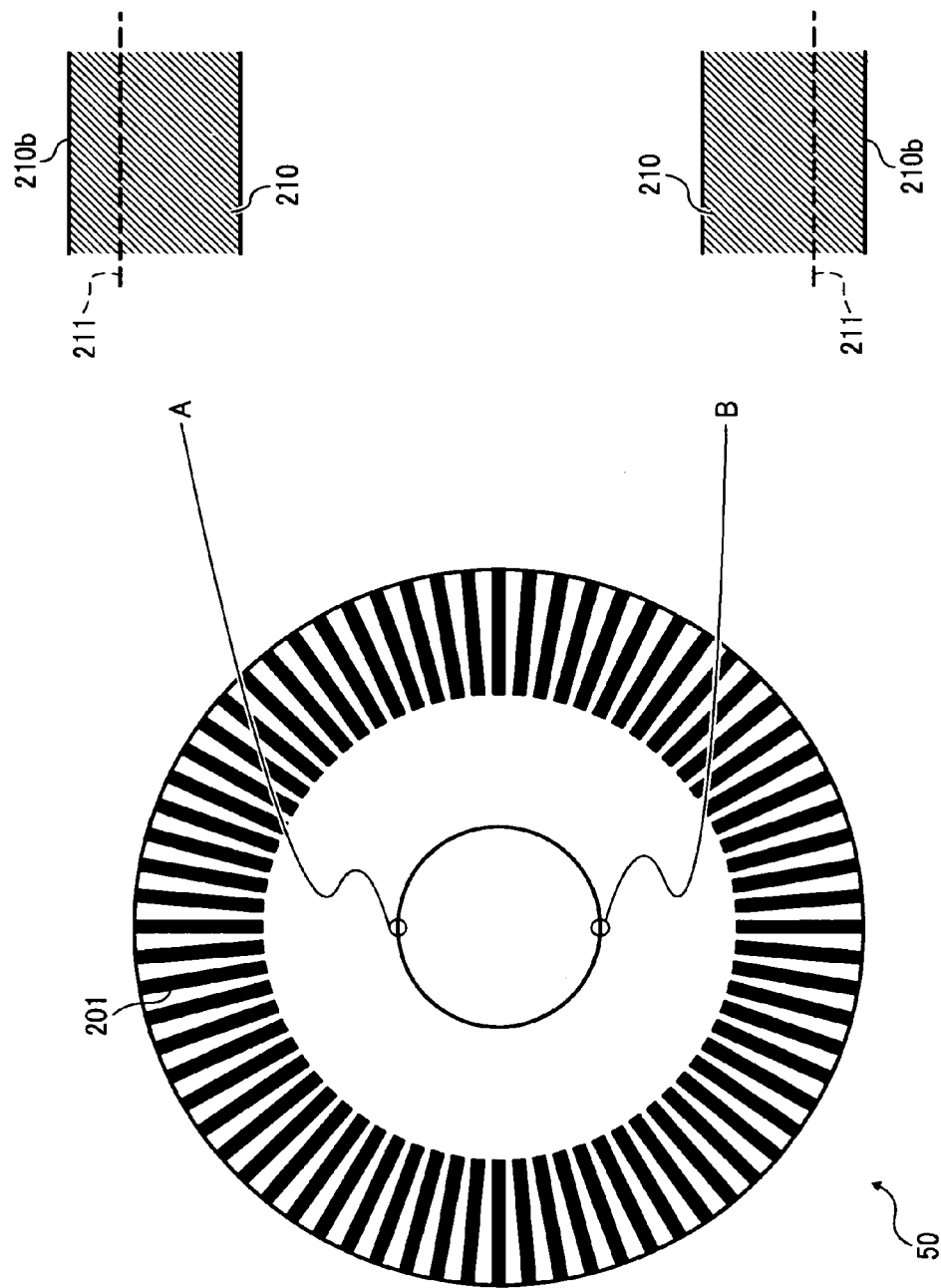
FIG. 23 shows a code wheel before a hole is formed according to a fourth embodiment of the present invention.

A code wheel 50 according to the fourth embodiment of the present invention is described with reference to FIGS. 23 to 25. The present embodiment is different from the first to third embodiments in size of the mark (reference circle) 210 of the code wheel 50. FIG. 23 shows the overall view of the code wheel 50 before the hole 203 is formed and enlarged views of points A, B. The outer diameter of the code wheel 50 is set to 20 mm, and the diameter of the hole 203 to be formed is set to 4 mm (radius 2 mm). A target position of the circumferential edge portion 203 of the hole 203 is indicated by a broken line 211 and the ring-like mark 210 is shown in the enlarged views. The diameter of an outer circumference 210b of the mark 210 is 4.02 mm (radius 2.01 mm), and the center position thereof coincides with that of the code portion 201 at a micron level precision. The code portion 201 and the mark 210 are concurrently formed by pattern drawing technique such as photolithography, photoresist, or etching. After formation of the code portion 201 and the mark 210, the hole 203 is formed so that its center position coincides with that of the code portion 201 and the mark 210.

Figure 24:
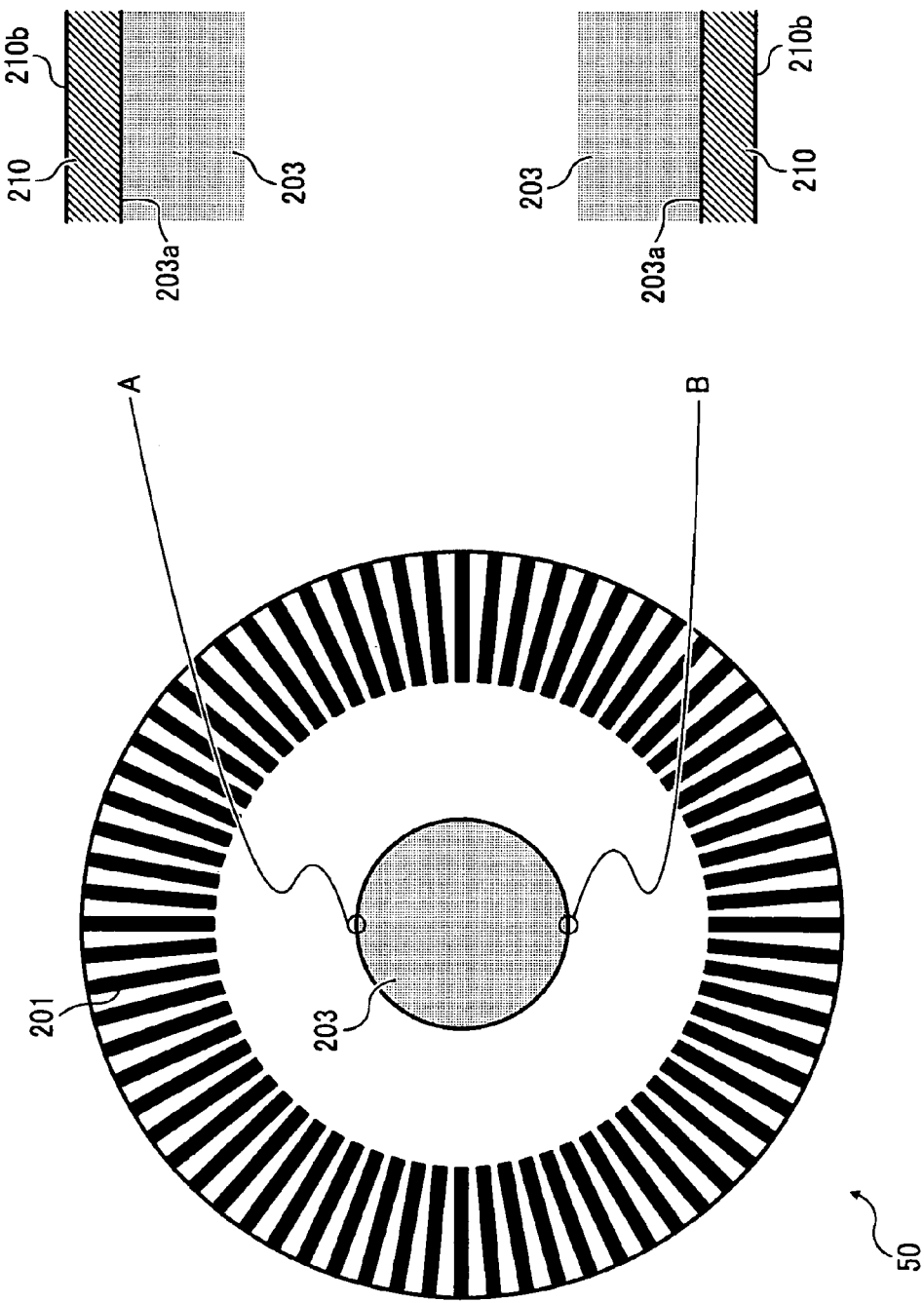
FIG. 24 shows the code wheel according to the fourth embodiment of the present invention.
Figure 25:
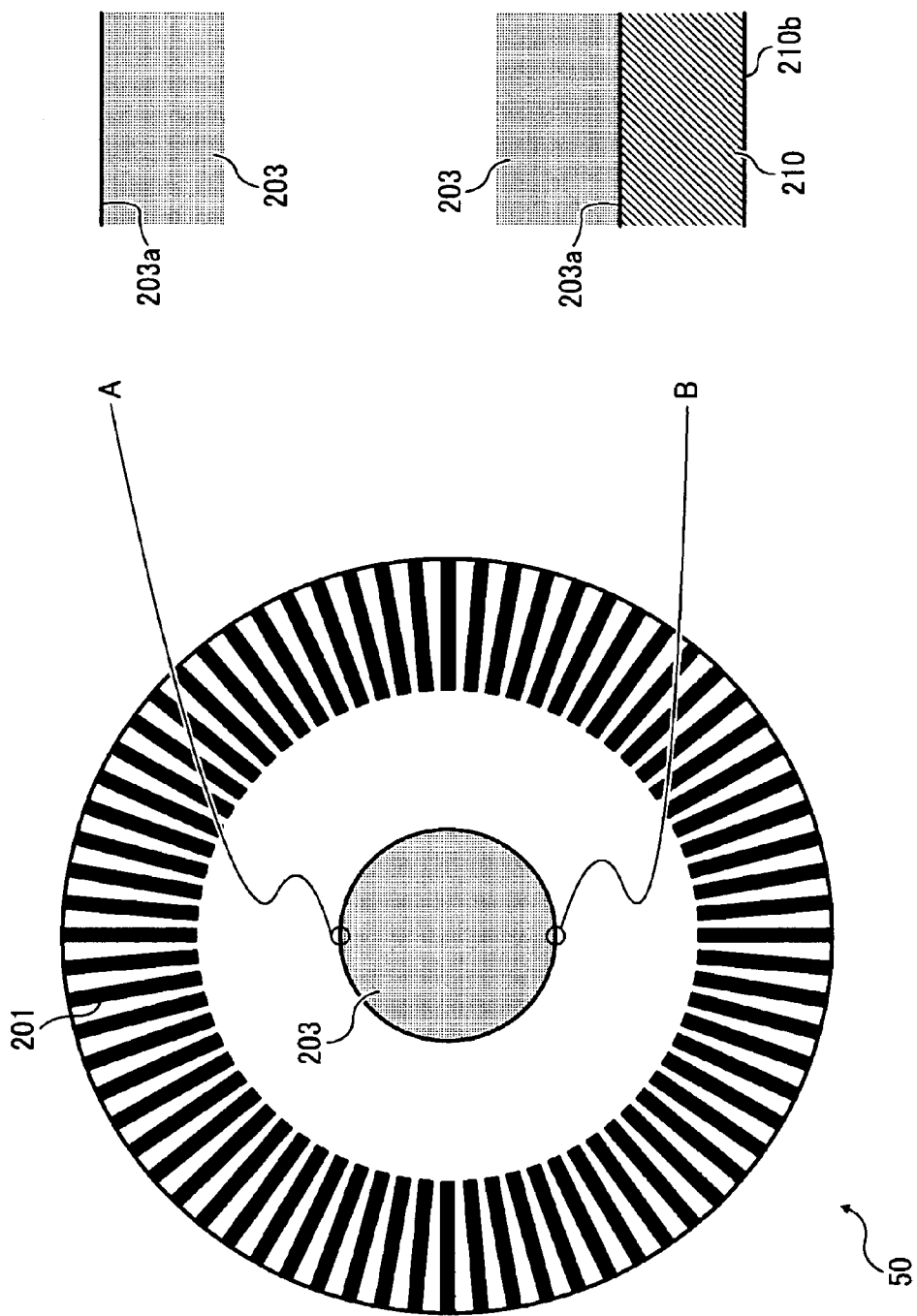
FIG. 25 shows the code wheel when a displacement of a hole position is larger than that in FIG. 24.

FIG. 24 shows the code wheel 50 after the hole 203 is formed and enlarged views of points A, B of the circumferential edge portion 203a. The mark 210 is seen in both the enlarged views. The mark 210 will remain around the entire circumference of the hole 203 when displacement of the center positions between the hole 203 and the outer circumference of mark 210 is less than 0.01 mm. FIG. 25 shows the code wheel 50 with the displacement of the center positions being 0.01 mm or more. As seen in the enlarged view of point A, the mark 210 is eliminated because the center position of the hole 203 is displaced from that of the outer circumference of the mark 210 by 0.01 mm or more in an upward direction in the drawing.

Thus, it is possible to determine the displacement to be less than 0.01 mm by simply checking that the mark 210 is eliminated all around the inner circumference of the hole 203 using a magnifying glass or the like. With the displacement being 0.01 mm or more, a direction of the displacement can be determined.

Since the code portion 201 and the mark 210 are precisely formed to have the same center position as described above, it is possible to determine, from a result of the above displacement determination, amount and direction of the displacement of the center positions of the code portion 201 and the hole 203.

In accordance with a level of required precision of the center positions, the diameter of the outer circumference of the mark 210 can be set such that the higher the level, the smaller the diameter. Generally, a tolerance of the above displacement is required to be less than 0.1 mm. Accordingly, the diameter of the outer circumference of the mark 210 need be set to 4.2 mm (radius 2.1 mm) or less which is slightly larger than that of the hole 203 (+0.2 mm or less in diameter).

Figure 26:
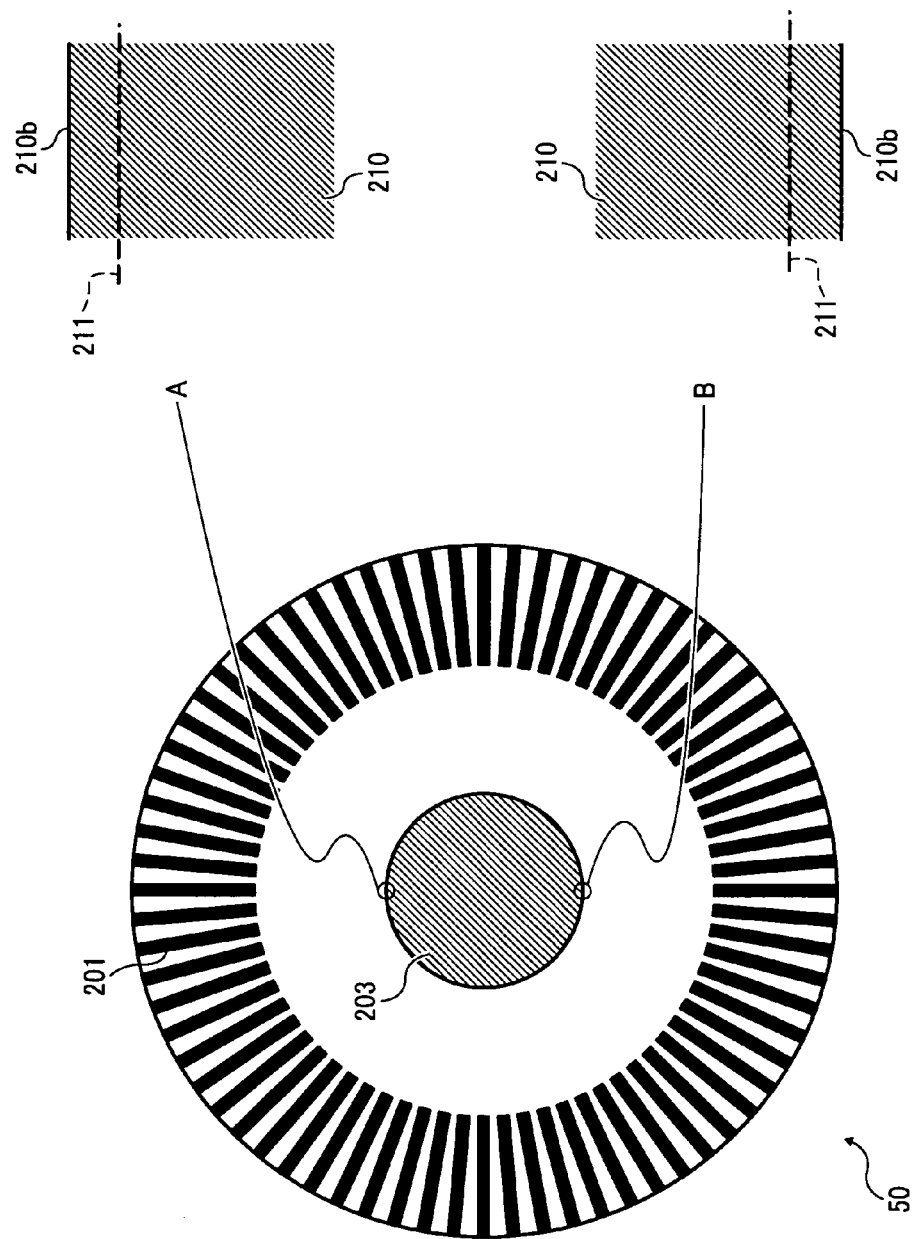
FIG. 26 shows a similar code wheel to that in FIG. 23 before a hole is formed.

In the present embodiment, the diameter of the inner circumference of the mark 210 can be set to 0 mm (with no inner circumference) as shown in the code wheel 50 before formation of the hole 203 in FIG. 26. The code wheel 50 after the formation of the hole 203 will be the same as that in FIGS. 24, 25.

Fifth Embodiment

Figure 27:
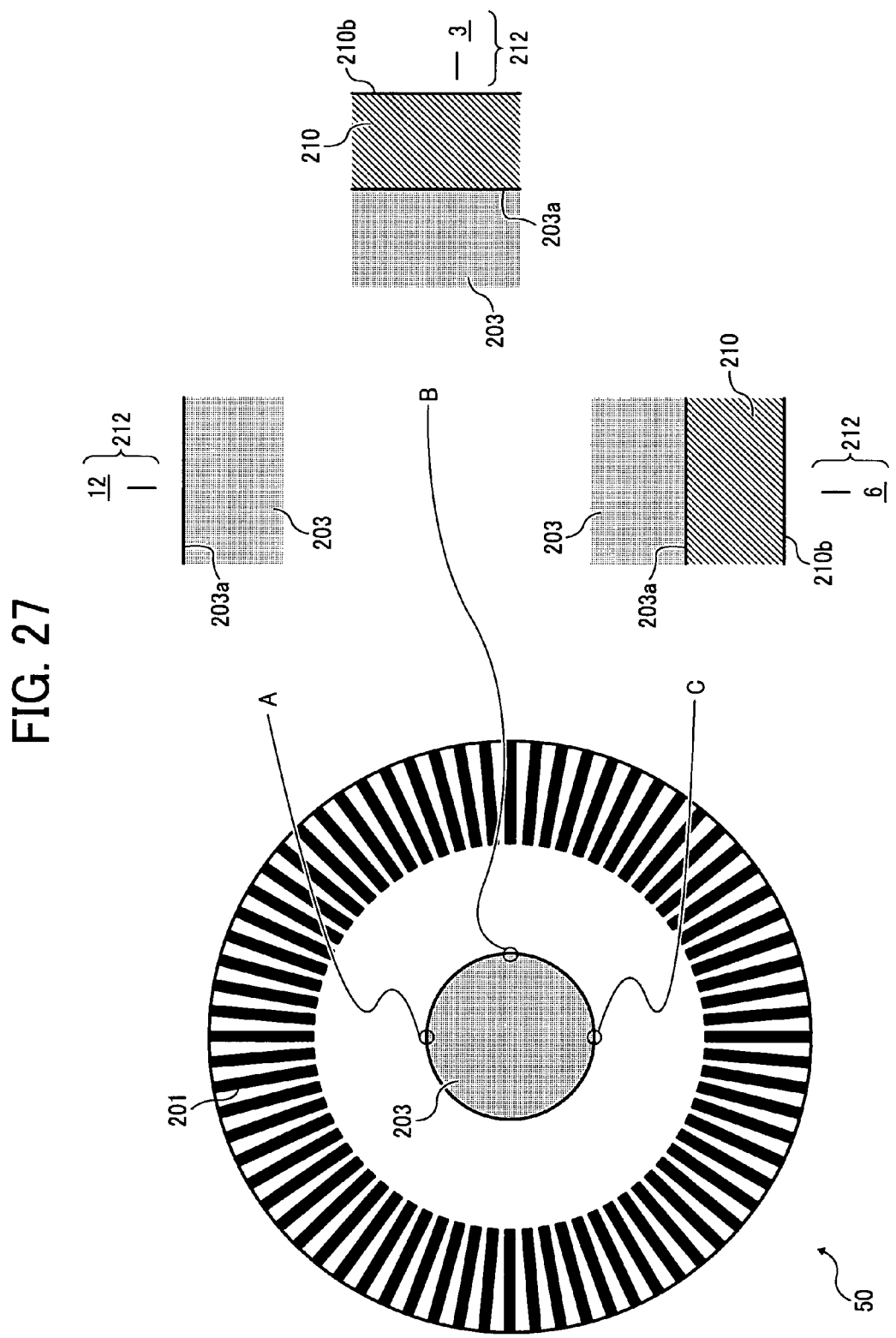
FIG. 27 shows a code wheel according to a fifth embodiment of the present invention.

A code wheel 50 according to the fifth embodiment of the present invention is described with reference to FIG. 27. The present embodiment is different from the fourth embodiment that an positional indicator in a circumference direction is added to a portion outside the hole 203 near the mark (reference circle) 210. FIG. 27 shows the code wheel 50 in the same state as that in FIG. 25, and enlarged views of points A, B, C. In the vicinity of the mark 210 and outside the hole 203, an indicator 212 with 12 evenly divided scales and numerals 1 to 12 is provided to indicate a position in a circumferential direction. In the enlarged views three numerals 12, 3, 6 of the indicator 212 are shown. The rest of the fifth embodiment is the same as the fourth embodiment.

It can be determined from FIG. 27 that displacement of the center positions between the hole 203 and the outer circumference of the mark 210 is 0.01 mm or more and the displacement occurs in a direction to the numeral 12 (upwards in FIG. 27).

Since the code portion 201 and the mark 210 are precisely formed to have the same center position as described above, it is possible to determine, from a result of the above displacement determination, amount and direction of the displacement of the center positions of the code portion 201 and the hole 203.

Sixth Embodiment

Figure 28:
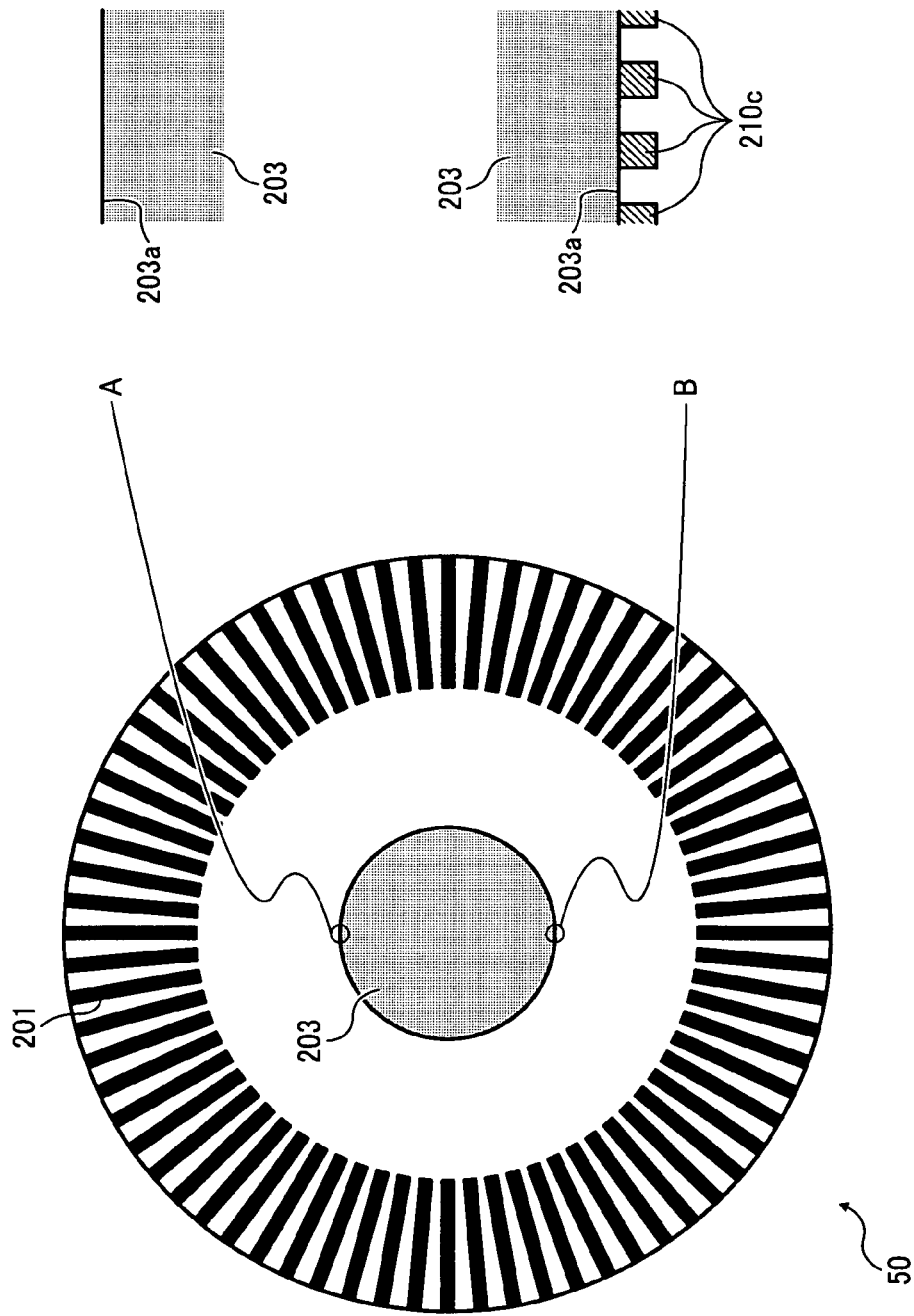
FIG. 28 shows a code wheel according to a sixth embodiment of the present invention.

A code wheel 50 according to the sixth embodiment of the present invention is described with reference to FIG. 28. The present embodiment is different from the second embodiment that the mark 210 (reference circle) is formed in an evenly intermittent circle in the circumference direction. FIG. 28 shows the code wheel 50 in the same state as that in FIG. 18 and enlarged view of points A, B. A mark 210c is evenly divided in the circumference direction. The rest of the sixth embodiment is the same as the second embodiment.

With a displacement of the center positions between the hole 203 and the outer circumference of the mark 210c being 0.01 mm or more, the intermittent mark 210c will be seen as in the enlarged view B of FIG. 28. In accordance with the amount of the displacement, a remaining portion of the mark 210c around the circumference of the hole 203 changes, that is, the number of strips of the intermittent mark 210c changes such that the larger the displacement, the larger the number of strips. Therefore, by counting the number of strips of the mark 210, the amount of the displacement can be obtained.

Since the code portion 201 and the mark 210 are precisely formed to have the same center position as described above, it is possible to determine, from a result of the above displacement determination, amount and direction of the displacement of the center positions of the code portion 201 and the hole 203.

Seventh Embodiment

Figure 29:
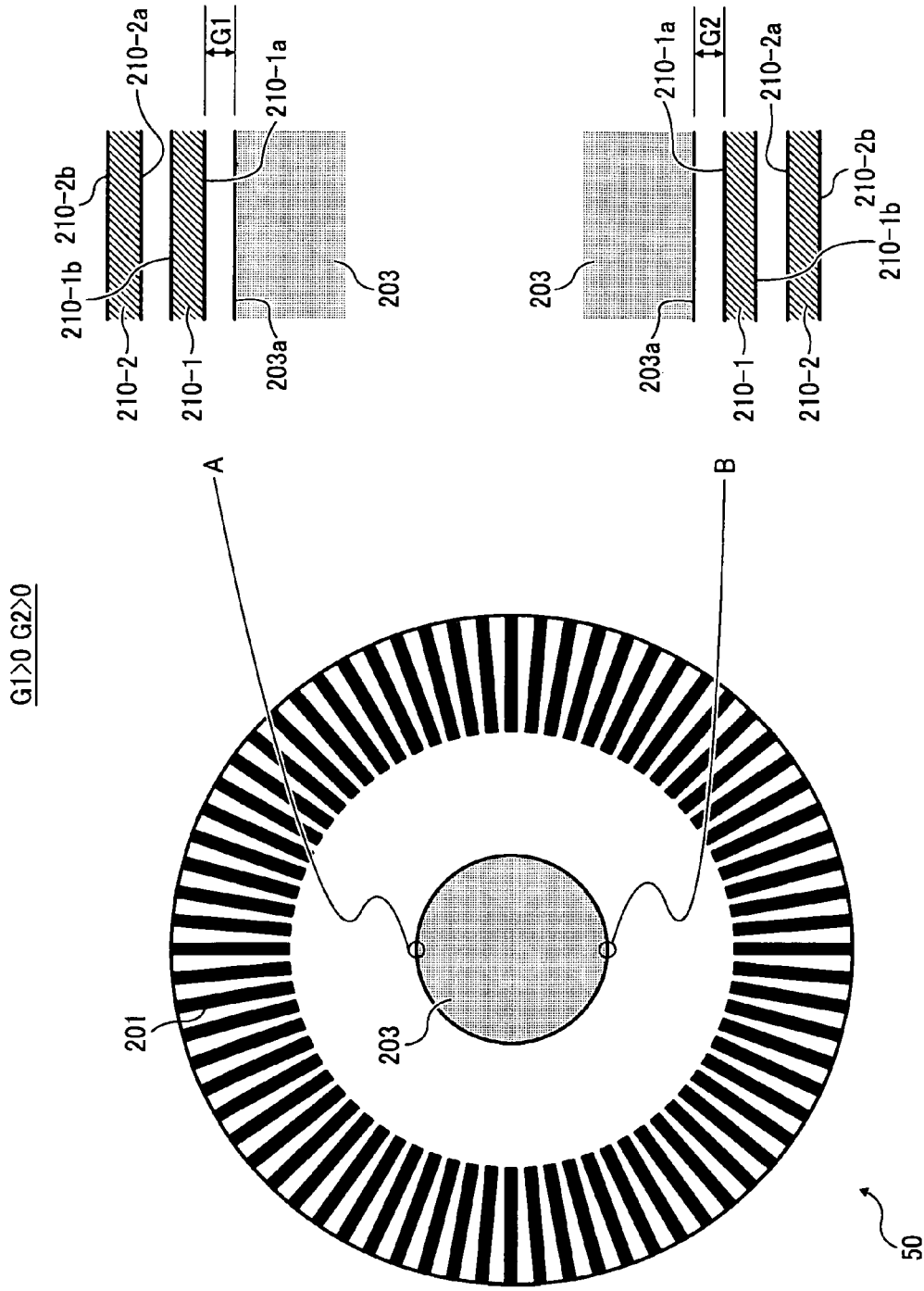
FIG. 29 shows a code wheel according to a seventh embodiment of the present invention.

A code wheel 50 according to the seventh embodiment of the present invention is described with reference to FIGS. 29 to 33. The present embodiment is different from the first embodiment that the mark 210 is a plurality of concentric circles with different diameters. FIG. 29 shows the code wheel 50 in the same state as that in FIG. 9 and enlarged views of points A, B. The mark 210 is composed of two circles, 210-1 and 201-2. The outer diameter of the code wheel 50 is set to 20 mm and the diameter of the hole 203 is set to 4 mm (radius 2 mm) as in FIG. 9.

The diameter of the inner circumference 210-1a of the mark 210-1 is 4.01 mm (radius 2.005 mm) and that of the outer circumference 210-1b of the mark 210-1 is 4.02 mm (radius 2.01 mm) while the diameter of the inner circumference 210-2a of the mark 210-2 is 4.03 mm (radius 2.015 mm) and that of the outer circumference 210-2b of the mark 210-2 is 4.04 mm (radius 2.02 mm). Their respective center positions all coincide with that of the code portion 201 at a micron level precision.

The hole 203 is formed after formation of the code portion 201 and the mark 210 so that its center position coincides with that of the code portion 201 and that of the inner circumference of the mark 210.

As shown in the two enlarged views in FIG. 29, with a displacement of the center positions between the hole 203 and the inner circumference 210-1a of the mark 210 being 0.005 mm or less, there will be gaps G1, G2 between the circumferential edge portion 203a of the hole 203 and the inner circumference 210-1a of the mark 210.

Figure 30:
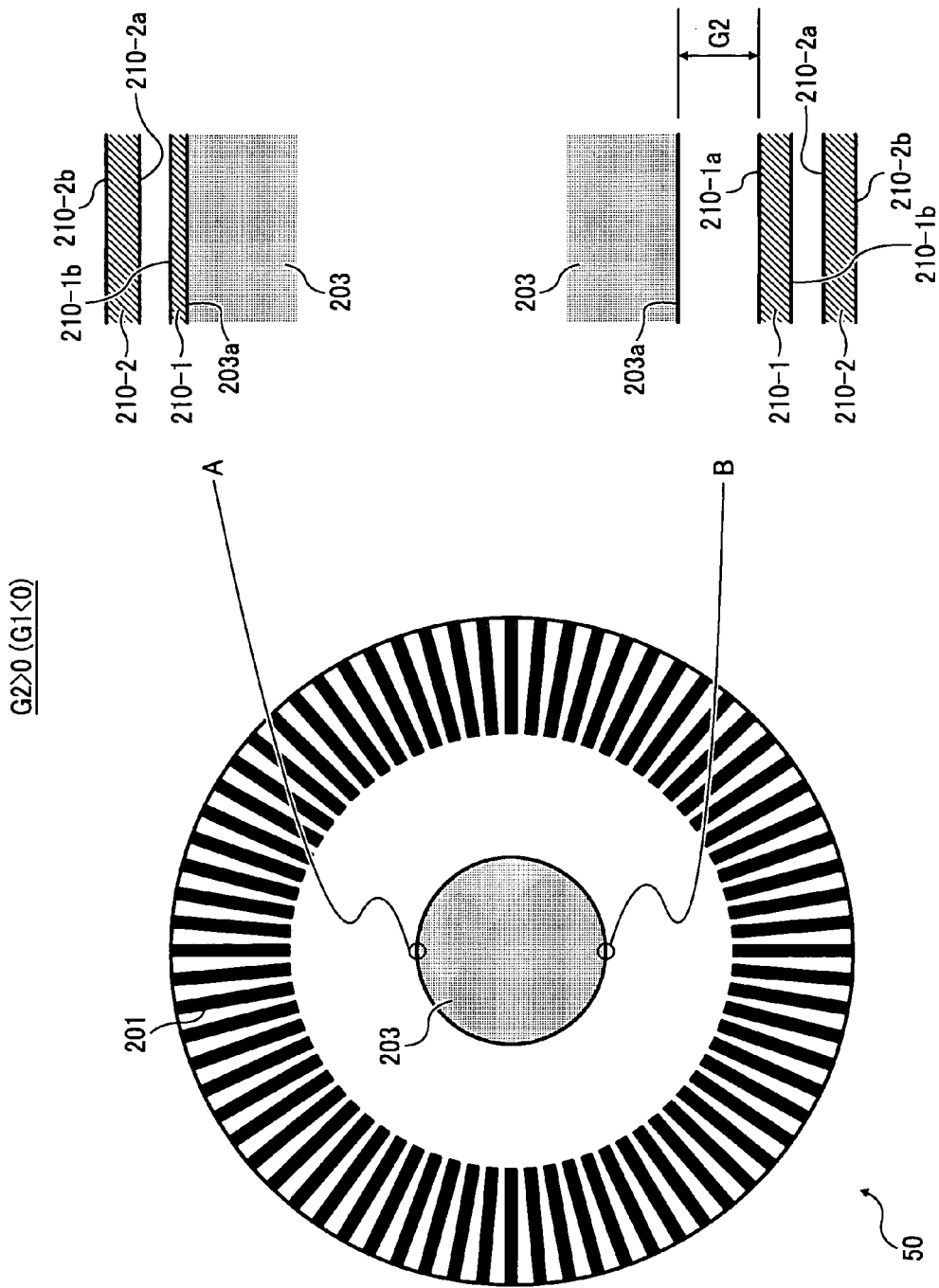
FIG. 30 shows the code wheel when a displacement of a hole position is larger than that in FIG. 29.

FIG. 30 shows the code wheel 50 with the displacement being 0.005 mm or more and 0.01 mm or less. In the enlarged view of point A, the gap G1 is eliminated (the hole 203 is displaced in an upward direction in FIG. 30).

Figure 31:
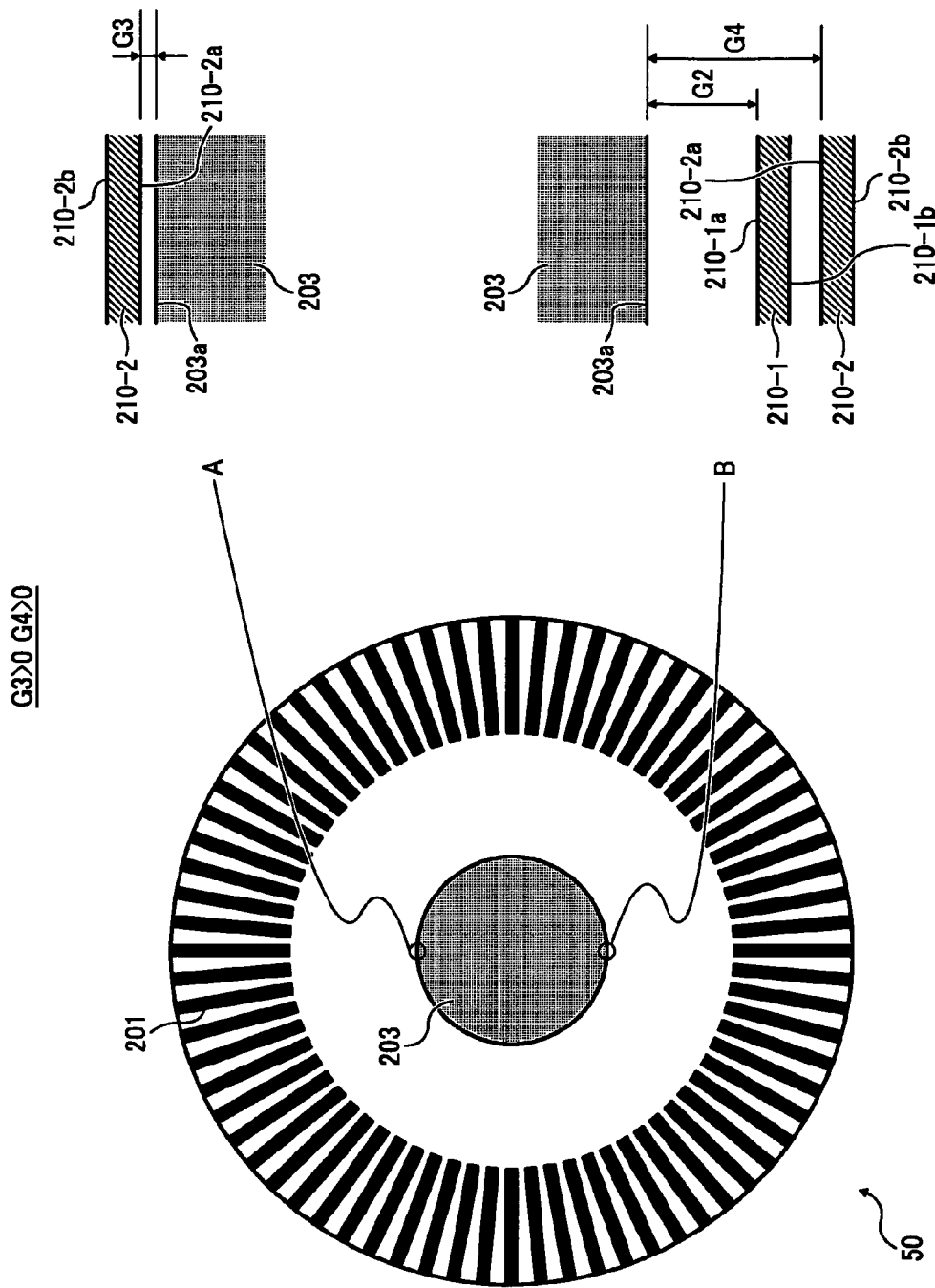
FIG. 31 shows the code wheel when a displacement of a hole position is larger than that in FIG. 30.

FIG. 31 shows the code wheel 50 with the displacement being 0.01 mm or more and 0.015 mm or less. In the enlarged view of point A, the mark 201-1 is eliminated (the hole 203 is displaced in an upward direction in FIG. 31). Also, there are gaps G3, G4 between the circumferential edge portion 203a of the hole 203 and the inner circumference 210-2a of the mark 210-2.

Figure 32:
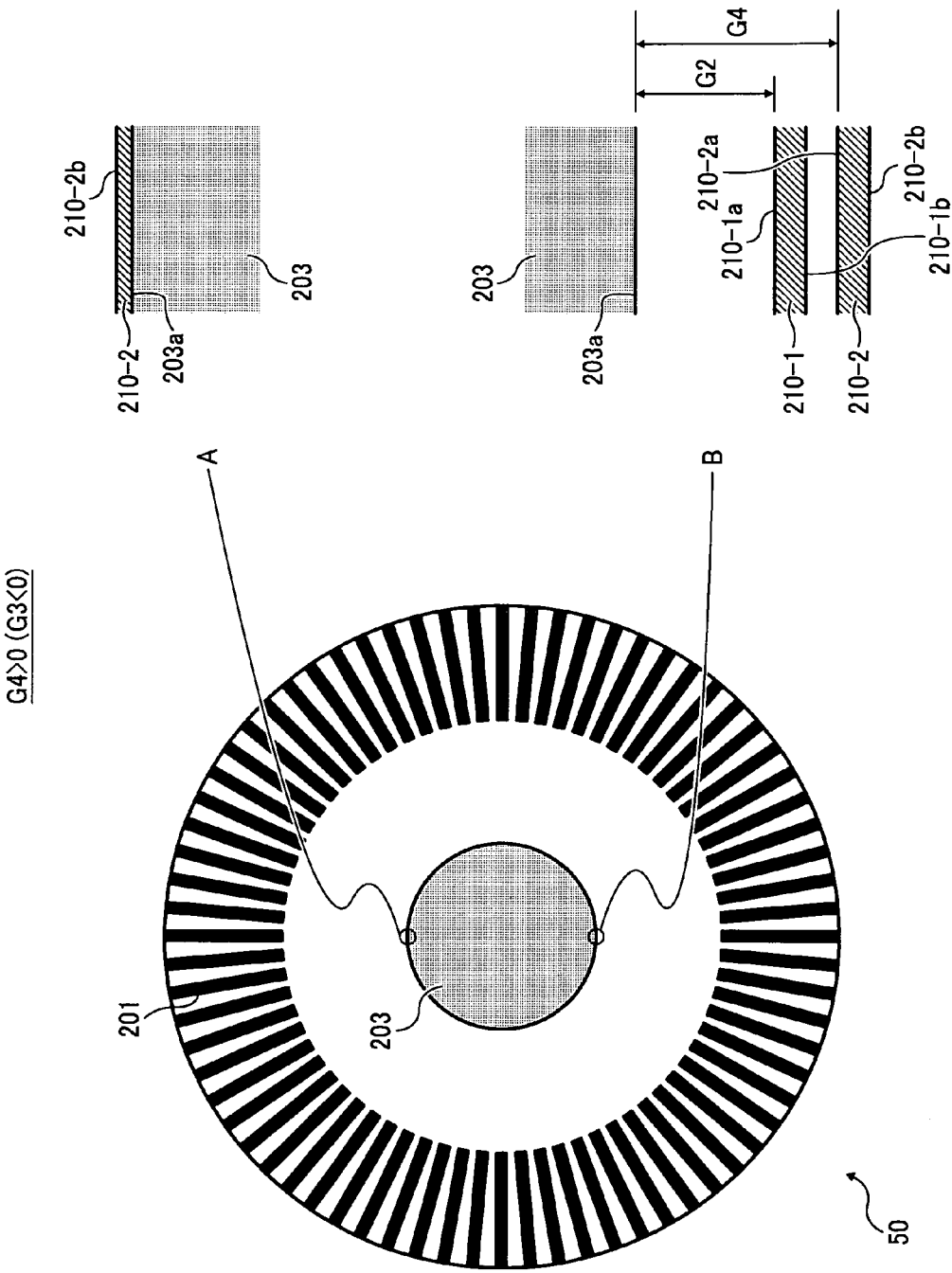
FIG. 32 shows the code wheel when a displacement of a hole position is larger than that in FIG. 31.

FIG. 32 shows the code wheel with the displacement being 0.015 mm or more and 0.020 mm or less. In the enlarged view of point A, the gap G3 is eliminated (the hole is displaced in an upward direction in FIG. 32).

Figure 33:
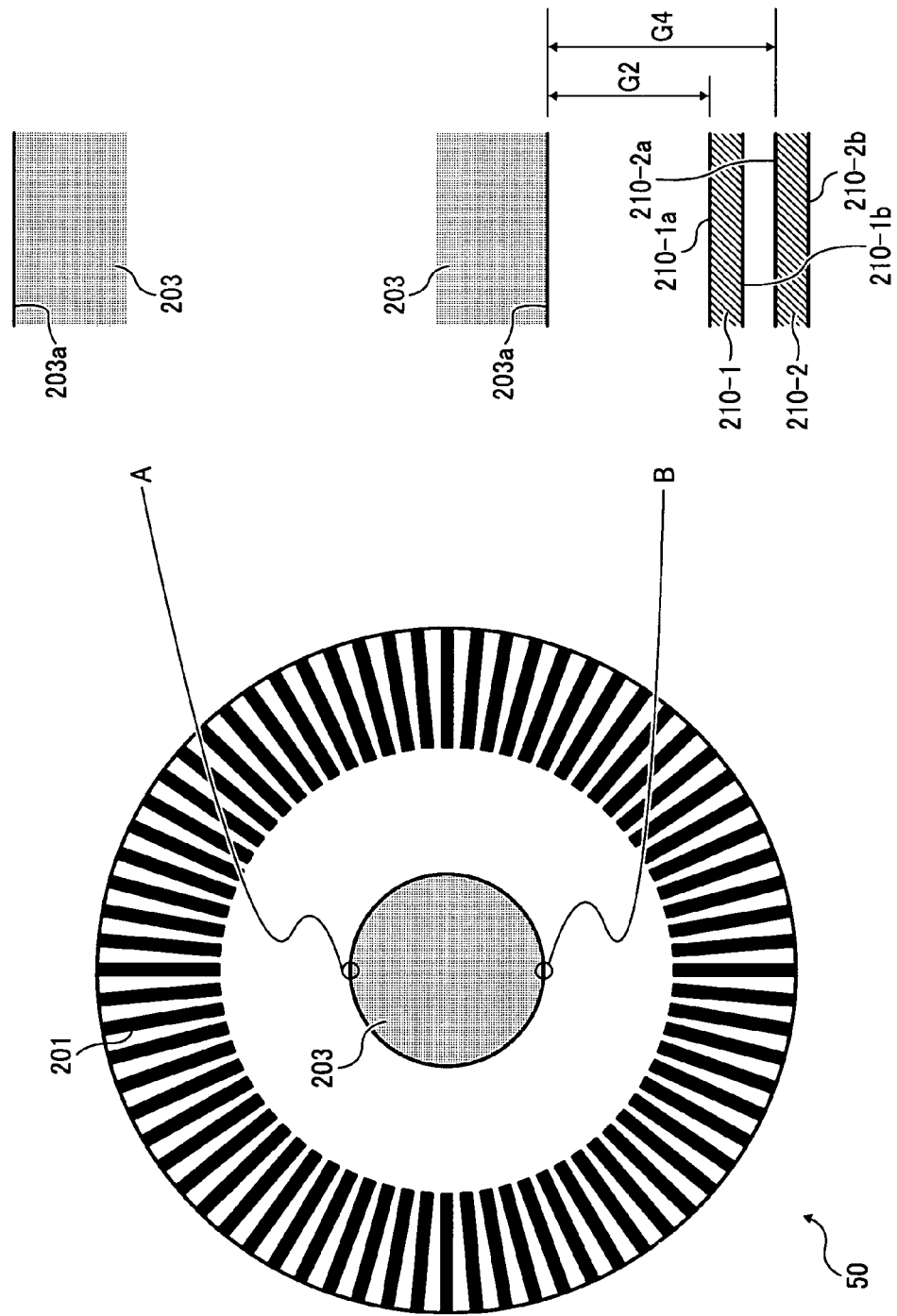
FIG. 33 shows the code wheel when a displacement of a hole position is larger than that in FIG. 32.

FIG. 33 shows the code wheel 50 with the displacement being 0.02 mm or more. In the enlarged view of point A, the mark 201-2 is eliminated (the hole is displaced in an upward direction in FIG. 33).

By checking around the circumferential edge portion 203a of the hole 203 using a magnifying glass or the like to see which of the states shown in FIGS. 29 to 33 the code wheel is in, the amount of displacement of the hole 203a can be determined in a range of 0 to 0.02 mm with 0.005 mm increments. Accordingly, it is possible to select a code wheel with a displacement within a desired tolerance and to manufacture code wheels at different quality levels.

Since the code portion 201 and the mark 210 are precisely formed to have the same center position as described above, it is possible to determine, from a result of the above displacement determination, amount and direction of the displacement of the center positions of the code portion 201 and the hole 203.

Eighth Embodiment

Figure 34:
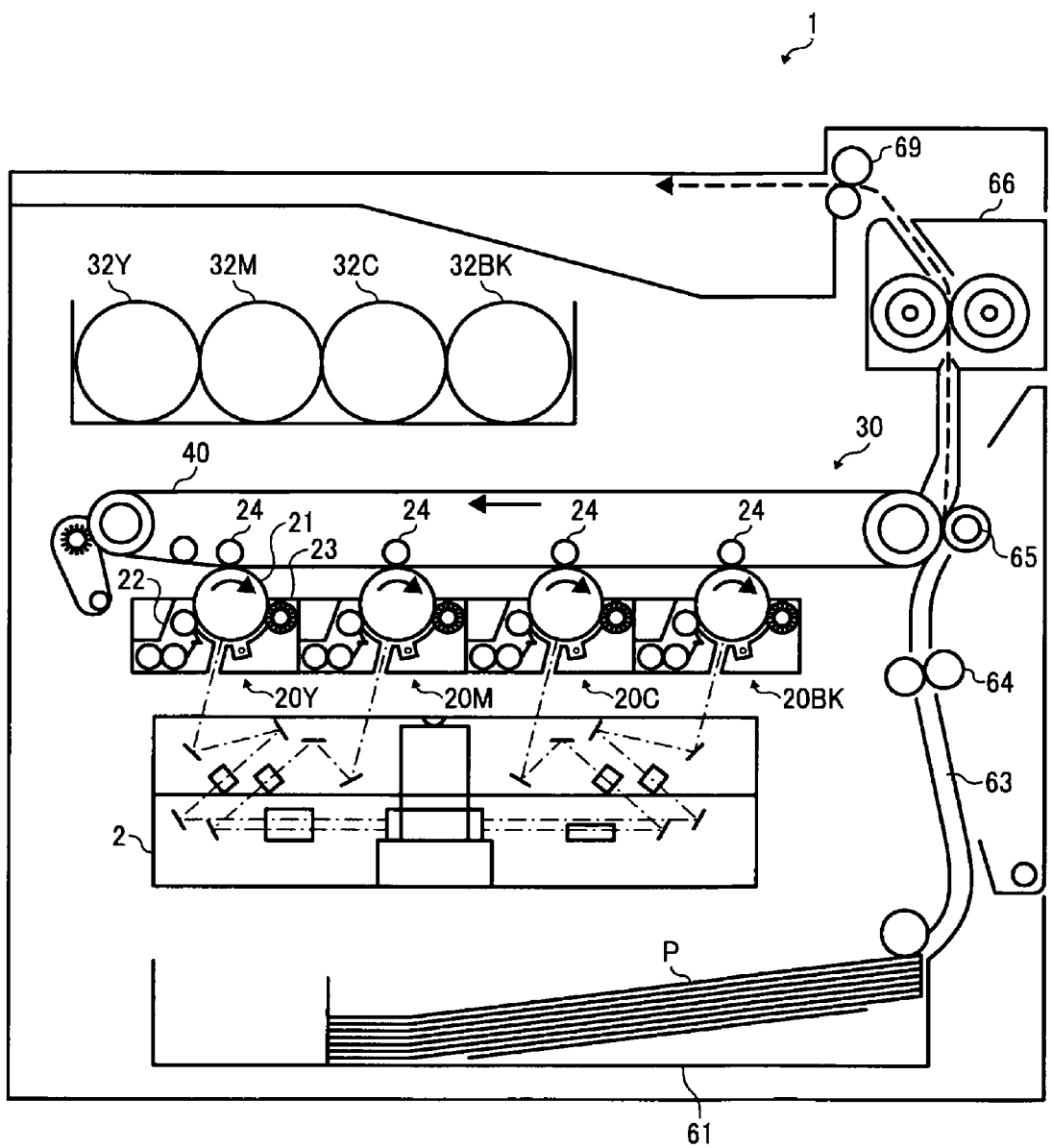
FIG. 34 shows the overall structure of an image forming apparatus according to an eighth embodiment of the present invention.

Next, an image forming apparatus according to the eighth embodiment of the present invention is described with reference to FIG. 34. FIG. 34 shows the overall structure of an image forming apparatus. This image forming apparatus is similar to that in FIG. 1 so that a difference between the two is mainly described.

While the image forming apparatus in FIG. 1 is configured to carry paper P via the transfer belt 40 to the transfer rollers 24 to sequentially transfer toner images in the four colors on the photoconductor drums 21 to the paper P, that in FIG. 34 is configured to temporarily transfer toner images in the four colors to the transfer belt 40 (intermediate transfer belt) at positions opposite to the transfer rollers 24. The paper P from a paper feed unit 61 passes a carrier guide 63 and is carried at a good timing via a resist roller pair 64 to a gap between a transfer roller 65 and the transfer belt 40. The toner images transferred onto the transfer belt 40 is then transferred onto the paper P. This image forming apparatus also comprises a belt carrier unit including a rotary encoder with the code wheel according to any of the first to seventh embodiments as that in FIG. 1. The rest of the structure and operation thereof is the same as that in FIG. 1 so that a description thereon is omitted.

Note that the above-described embodiments can be freely combined according to an object to achieve such as a size of the hole or an amount of displacement (concentricity) to control or determine. Further, the first to seventh embodiments have described an example that the code wheel 50 is made of rubber material as polyacetal and the code portion 201 is read with the transmissive photosensor 51. However, the code wheel 50 can be made of metal material as stainless and the code portion 201 can be read with a reflective photosensor.

According to the eighth embodiment, the present invention is applied to the transfer belt unit 30 (belt carrier unit) incorporating the transfer belt 40. However, application of the present invention is not limited thereto. The present invention is applicable to a belt carrier unit (transfer belt unit) using a transfer belt, a belt carrier unit (photoreceptor belt unit) using a photoreceptor belt or the like. Also, in this case the same effects as those of the above embodiments are attainable by mounting the rotary encoder of any of the above embodiments in a belt carrier roller (drive or driven roller) which contacts with a transfer belt or a photoreceptor belt.

Moreover, in the above embodiments, the rotary encoder is mounted in the driven roller 47 on which the transfer belt 40 is wound, aiming for stabilizing movability of the transfer belt 40. However, the rotary encoder can be mounted in any other rolling member to directly control rotation of the rolling member. For example, the rotary encoder according to any of the above embodiments can be integrally mounted on the shaft of the photoconductor drum 21 to control rotation thereof (feedback control). In this case, the same effects as those in the above embodiments are also attainable.

As described through the above embodiments, the present invention can achieve a code wheel manufacturing method without a complex, time consuming hole forming process or a large-scale inspection, a code wheel which can be examined easily in quality and is manufactured by the above manufacturing method, a rotary encoder incorporating such a code wheel, and a rotation control unit, a belt carrier unit and an image forming apparatus incorporating such a rotary encoder.

The code wheel according to the present invention can be easily examined in a short time by anyone in any place with a magnifying glass without a specific device as a microscope or a projector. The amount and direction of displacement of the center positions of the code portion and the hole can be determined in any field site other than a manufacturing facility provided with expensive equipment. The code wheel manufacturing method according to the present invention makes it possible to perform, easily and in a shorter period of time, quality control over rotary encoder products or problem analysis when it occurs. The rotary encoder, rotation control unit, belt carrier unit, and image forming apparatus according to the present invention comprise a non-expensive, high quality code wheel according to the present invention so that maintenance and repair of the code wheel can be facilitated.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A manufacturing method for a code wheel for a rotary encoder, the code wheel including, in a central portion, a hole into which a rotary shaft of a rotary member is fitted and a code portion including a radial code pattern in a circumferential edge portion, the method comprising:
    forming the code portion and a reference circle in a plate so that the reference circle has a radius larger than a radius of the hole by a tolerance of deviation between a center position of the code portion and a center position of the hole, and the reference circle has a same center as that of the code portion; and
    forming the hole in the plate in which the code portion and the reference circle are formed, so as to be contained in the reference circle,
    wherein the radius of the reference circle is set to be able to tolerate the deviation even when a circumference of the reference circle and a circumference of the hole overlap with each other.

2. A manufacturing method according to claim 1, wherein:
the reference circle forming step comprises a step of forming a plurality of reference circles in accordance with a plurality of tolerances of the deviation; and
the hole forming step comprises a step of selecting a reference circle from the plurality of reference circles in accordance with a predetermined tolerance of the deviation.

3. A manufacturing method according to claim 2, wherein among the plurality of reference circles, at least adjacent reference circles are formed in different colors.

4. A manufacturing method for a code wheel for a rotary member, the code wheel including, in a central portion, a hole into which a rotary shaft of a rotary member is fitted and a code portion including a radial code pattern in a circumferential edge portion, the method comprising:
forming the code portion and a reference circle in a plate before forming the hole so that the reference circle has a radius larger than a radius of the hole by a tolerance of deviation between a center position of the code portion and a center position of the hole, and the reference circle has a same center as that of the code portion; and
forming the hole in the plate in which the code portion and the reference circle are formed, so as to eliminate the reference circle.

5. A manufacturing method according to claim 4, wherein:
the reference circle forming step comprises a step of forming a plurality of reference circles in accordance with a plurality of tolerances of the deviation; and
the hole forming step comprises a step of selecting a reference circle from the plurality of reference circles in accordance with a predetermined tolerance of the deviation.

6. A manufacturing method according to claim 5, wherein among the plurality of reference circles, at least adjacent reference circles are formed in different colors.

7. A code wheel which is manufactured by the manufacturing method according to claim 1 and comprises an indicator that the code wheel is manufactured by the manufacturing method.

8. A code wheel which is manufactured by the manufacturing method according to claim 4 and comprises an indicator that the code wheel is manufactured by the manufacturing method.

9. A code wheel for a rotary encoder, comprising:
a hole into which a rotary shaft of a rotary member is fitted, in a central portion;
a code portion including a radial code pattern in a circumferential edge portion; and
a reference circle having a same center as that of the code portion and having a radius larger than a radius of the hole by a tolerance of deviation between a center position of the code portion and a center position of the hole,
wherein the radius of the reference circle is set to be able to tolerate the deviation even when a circumference of the reference circle and a circumference of the hole overlap with each other.

10. A code wheel according to claim 9, wherein the reference circle is an outer circumference and/or an inner circumference of a ring having a width.

11. A code wheel according to claim 9, wherein the reference circle is formed intermittently in a circumferential direction.

12. A rotary encoder comprising:
the code wheel according to claim 7; and
an encoder sensor.

13. A rotary encoder comprising:
the code wheel according to claim 8; and
an encoder sensor.

14. A rotation control unit comprising:
the rotary encoder according to claim 12 measuring a rotation speed of the rotary member; and
a feedback control mechanism controlling a rotation of the rotary member in accordance with the rotation speed measured by the rotary encoder.

15. A rotation control unit comprising:
the rotary encoder according to claim 13 measuring a rotation speed of the rotary member; and
a feedback control mechanism controlling a rotation of the rotary member in accordance with the rotation speed measured by the rotary encoder.

16. A belt carrier unit which carries a member by moving a belt extending to the rotary member, comprising
the rotation control unit according to claim 14.

17. A belt carrier unit which carries a member by moving a belt extending to the rotary member, comprising
the rotation control unit according to claim 15.

18. An image forming apparatus comprising the belt carrier unit according to claim 16 to carry a member on which an image is formed.

19. An image forming apparatus comprising the belt carrier unit according to claim 17 to carry a member on which an image is formed.

20. A code wheel for a rotary encoder according to claim 9, wherein the circumference of the reference circle and the circumference of the hole overlap with each other.

* * * * *